US007249277B2

(12) United States Patent
Arai et al.

(10) Patent No.: US 7,249,277 B2
(45) Date of Patent: Jul. 24, 2007

(54) DISK ARRAY INCLUDING PLURAL EXCHANGEABLE MAGNETIC DISK UNIT

(75) Inventors: Masahiro Arai, Kawasaki (JP); Ikuya Yagisawa, Tokyo (JP); Yoichi Mizuno, Yokohama (JP); Naoto Matsunami, Hayama-machi (JP)

(73) Assignee: Hitachi, Ltd., Tokyo (JP)

( * ) Notice: Subject to any disclaimer, the term of this patent is extended or adjusted under 35 U.S.C. 154(b) by 307 days.

(21) Appl. No.: 10/860,498

(22) Filed: Jun. 4, 2004

(65) Prior Publication Data

US 2005/0204206 A1 Sep. 15, 2005

(30) Foreign Application Priority Data

Mar. 11, 2004 (JP) .............................. 2004-068348

(51) Int. Cl.
*G06F 11/00* (2006.01)
(52) U.S. Cl. ..................... 714/6; 714/5; 714/7; 711/114
(58) Field of Classification Search .................... 714/7, 714/5, 6; 710/302; 711/114
See application file for complete search history.

(56) References Cited

U.S. PATENT DOCUMENTS

| 5,652,741 | A |   | 7/1997 | Takagi et al. |
| 5,659,704 | A | * | 8/1997 | Burkes et al. ............... 711/114 |
| 5,875,457 | A | * | 2/1999 | Shalit .......................... 711/114 |
| 6,098,119 | A |   | 8/2000 | Surugucchi et al. |
| 6,370,604 | B1 | * | 4/2002 | Sreekanti .................... 710/302 |
| 6,502,204 | B2 | * | 12/2002 | Achiwa et al. ................. 714/6 |
| 6,754,767 | B2 |   | 6/2004 | Gold |
| 6,766,469 | B2 | * | 7/2004 | Larson et al. .................. 714/7 |
| 6,845,465 | B2 |   | 1/2005 | Hashemi |
| 6,874,100 | B2 | * | 3/2005 | Rauscher ...................... 714/6 |
| 2002/0152416 | A1 |   | 10/2002 | Fukuda |
| 2004/0064638 | A1 | * | 4/2004 | Chong ....................... 711/114 |
| 2004/0073747 | A1 |   | 4/2004 | Lu |
| 2004/0193939 | A1 |   | 9/2004 | Tanaka et al. |
| 2005/0102552 | A1 | * | 5/2005 | Horn ............................. 714/6 |
| 2005/0154815 | A1 | * | 7/2005 | Molander et al. ........... 710/302 |

FOREIGN PATENT DOCUMENTS

| EP | 0541992 | 5/1993 |
| EP | 0660236 | 6/1995 |
| JP | 9-016343 | 1/1997 |

\* cited by examiner

*Primary Examiner*—Marc Duncan
(74) *Attorney, Agent, or Firm*—Mattingly, Stanger, Malur & Brundidge, P.C.

(57) ABSTRACT

To provide a storage apparatus in which a plurality of drives in a unit are separately treated and the unit can be easily exchanged for another unit even when RAID groups are freely composed. The storage apparatus includes a plurality of drive cases in each of which a plurality of units are detachably mounted, each of the units including a plurality of drives that are detachably, and a controller case in which a disk control section is provided, wherein the disk control section comprises a RAID group creation section for creating a RAID group using the plurality of disks and an exchange indicating section for giving a notice that a unit is ready to exchange after rebuilding or copying of data in disks included in the unit at the time of exchange of the unit.

9 Claims, 36 Drawing Sheets

FIG. 8

| UNIT ID / DRIVE NO. | A | B | C | D | E | F | |
|---|---|---|---|---|---|---|---|
| 0 | 146GB IN USE ① | 146GB IN USE ② | 146GB IN USE ② | 146GB IN USE ② | 146GB IN USE ② | 146GB IN USE ② | |
| 1 | 146GB IN USE ① | 146GB IN USE ① | 146GB IN USE ③ | 146GB IN USE ③ | 146GB IN USE ③ | 146GB IN USE ③ | |
| 2 | 146GB SPARE | 146GB IN USE ① | 146GB IN USE ① | 146GB SPARE | 146GB SPARE | 146GB IN USE ③ | |
| 3 | 146GB IN USE ④ | 146GB IN USE ④ | 146GB IN USE ④ | 146GB IN USE ④ | 146GB IN USE ④ | 146GB IN USE ④ | |

DRIVE SETTING CONTENT HOLDING TABLE
1915

FIG. 9

| UNIT ID DRIVE NO. | A | B | C | D | E | F | |
|---|---|---|---|---|---|---|---|
| 0 | 146GB IN USE ① | 146GB FAULT ② | 146GB IN USE ② | 146GB IN USE ② | 146GB IN USE ② | 146GB IN USE ② | |
| 1 | 146GB IN USE ① | 146GB IN USE ① | 146GB IN USE ③ | 146GB IN USE ③ | 146GB IN USE ③ | 146GB IN USE ③ | |
| 2 | 146GB SPARE | 146GB IN USE ① | 146GB IN USE ① | 146GB SPARE | 146GB SPARE | 146GB IN USE ③ | |
| 3 | 146GB IN USE ④ | 146GB IN USE ④ | 146GB IN USE ④ | 146GB IN USE ④ | 146GB IN USE ④ | 146GB IN USE ④ | |

DRIVE STATE MANAGEMENT TABLE
1916

FIG. 10

| RAID GROUP NO. | TOTAL CAPACITY (GB) | RAID LEVEL | NORMAL REDUNDANCY | CURRENT REDUNDANCY | COMPOSING DRIVE | STATE |
|---|---|---|---|---|---|---|
| ① | 580GB | RAID5 | 1 | 1 | A0 B1 C2<br>A1 B2 | NORMAL |
| ② | 580GB | RAID5 | 1 | 0 | B0 D0 F0<br>C0 E0 | FAULT |
| ③ | 430GB | RAID5 | 1 | 1 | C1 E1 F2<br>D1 F1 | NORMAL |
| ④ | 580GB | RAID6 | 2 | 2 | A3 C3 E3<br>B3 D3 F3 | NORMAL |

RAID GROUP STATE MANAGEMENT TABLE
1917

BACKGROUND PROCESSING NUMBER MANAGEMENT TABLE

FIG. 18

BEFORE OCCURRENCE OF FAULT

| DRIVE NO. \ UNIT ID | A | B | C | D | E | F | |
|---|---|---|---|---|---|---|---|
| 0 | 146GB IN USE ① | 146GB IN USE ② | 146GB IN USE ② | 146GB IN USE ② | 146GB IN USE ② | 146GB IN USE ② | |
| 1 | 146GB IN USE ① | 146GB IN USE ① | 146GB IN USE ③ | 146GB IN USE ③ | 146GB IN USE ③ | 146GB IN USE ③ | |
| 2 | 146GB SPARE | 146GB IN USE ① | 146GB IN USE ① | 146GB SPARE | 146GB SPARE | 146GB SPARE | |
| 3 | 146GB IN USE ④ | 146GB IN USE ④ | 146GB IN USE ④ | 146GB IN USE ④ | 146GB IN USE ④ | 146GB IN USE ④ | |

FIG. 19

DURING DATA REBUILDING FOR DRIVE B0

| DRIVE NO. \ UNIT ID | A | B | C | D | E | F | |
|---|---|---|---|---|---|---|---|
| 0 | 146GB IN USE ① | 146GB FAULT ② | 146GB IN USE ② | 146GB IN USE ② | 146GB IN USE ② | 146GB IN USE ② | |
| 1 | 146GB IN USE ① | 146GB IN USE ① | 146GB IN USE ③ | 146GB IN USE ③ | 146GB IN USE ③ | 146GB IN USE ③ | |
| 2 | 146GB REBUILDING | 146GB IN USE ① | 146GB IN USE ① | 146GB SPARE | 146GB SPARE | 146GB SPARE | |
| 3 | 146GB IN USE ④ | 146GB IN USE ④ | 146GB IN USE ④ | 146GB IN USE ④ | 146GB IN USE ④ | 146GB IN USE ④ | |

FIG. 20

AFTER DATA REBUILDING

| DRIVE NO. \ UNIT ID | A | B | C | D | E | F | |
|---|---|---|---|---|---|---|---|
| 0 | 146GB IN USE (1) | 146GB FAULT | 146GB IN USE (2) | 146GB IN USE (2) | 146GB IN USE (2) | 146GB IN USE (2) | |
| 1 | 146GB IN USE (1) | 146GB IN USE (1) | 146GB IN USE (3) | 146GB IN USE (3) | 146GB IN USE (3) | 146GB IN USE (3) | |
| 2 | 146GB IN USE (2) | 146GB IN USE (1) | 146GB IN USE (1) | 146GB SPARE | 146GB SPARE | 146GB SPARE | |
| 3 | 146GB IN USE (4) | 146GB IN USE (4) | 146GB IN USE (4) | 146GB IN USE (4) | 146GB IN USE (4) | 146GB IN USE (4) | |

FIG. 21

DURING DATA COPYING OF DRIVE B1

| DRIVE NO. \ UNIT ID | A | B | C | D | E | F |
|---|---|---|---|---|---|---|
| 0 | 146GB IN USE (1) | 146GB FAULT ( ) | 146GB IN USE (2) | 146GB IN USE (2) | 146GB IN USE (2) | 146GB IN USE (2) |
| 1 | 146GB IN USE (1) | 146GB IN USE (1) | 146GB IN USE (3) | 146GB IN USE (3) | 146GB IN USE (3) | 146GB IN USE (3) |
| 2 | 146GB IN USE (2) | 146GB IN USE (1) | 146GB IN USE (1) | 146GB REFUSING | 146GB SPARE | 146GB SPARE |
| 3 | 146GB IN USE (4) | 146GB IN USE (4) | 146GB IN USE (4) | 146GB IN USE (4) | 146GB IN USE (4) | 146GB IN USE (4) |

FIG. 22

AFTER DATA REFUSING OF DRIVE B1

| DRIVE NO. \ UNIT ID | A | B | C | D | E | F | |
|---|---|---|---|---|---|---|---|
| 0 | 146GB IN USE (1) | 146GB FAULT | 146GB IN USE (2) | 146GB IN USE (2) | 146GB IN USE (2) | 146GB IN USE (2) | |
| 1 | 146GB IN USE (1) | 146GB IN USE ( ) | 146GB IN USE (3) | 146GB IN USE (3) | 146GB IN USE (3) | 146GB IN USE (3) | |
| 2 | 146GB IN USE (2) | 146GB IN USE (1) | 146GB IN USE (1) | 146GB IN USE (1) | 146GB SPARE | 146GB SPARE | |
| 3 | 146GB IN USE (4) | 146GB IN USE (4) | 146GB IN USE (4) | 146GB IN USE (4) | 146GB IN USE (4) | 146GB IN USE (4) | |

FIG. 23

DURING DATA COPYING OF DRIVE B2

| UNIT ID<br>DRIVE NO. | A | B | C | D | E | F | |
|---|---|---|---|---|---|---|---|
| 0 | 146GB<br>IN USE<br>① | 146GB<br>FAULT | 146GB<br>IN USE<br>② | 146GB<br>IN USE<br>② | 146GB<br>IN USE<br>② | 146GB<br>IN USE<br>② | |
| 1 | 146GB<br>IN USE<br>① | 146GB<br>IN USE<br>(  ) | 146GB<br>IN USE<br>③ | 146GB<br>IN USE<br>③ | 146GB<br>IN USE<br>③ | 146GB<br>IN USE<br>③ | |
| 2 | 146GB<br>IN USE<br>② | 146GB<br>IN USE<br>① | 146GB<br>IN USE<br>① | 146GB<br>REFUSING<br>① | 146GB<br>REFUSING | 146GB<br>SPARE | |
| 3 | 146GB<br>IN USE<br>④ | 146GB<br>IN USE<br>④ | 146GB<br>IN USE<br>④ | 146GB<br>IN USE<br>④ | 146GB<br>IN USE<br>④ | 146GB<br>IN USE<br>④ | |

FIG. 24

AFTER DATA REFUSING OF DRIVE B2

| DRIVE NO. \ UNIT ID | A | B | C | D | E | F | |
|---|---|---|---|---|---|---|---|
| 0 | 146GB IN USE (1) | 146GB FAULT | 146GB IN USE (2) | 146GB IN USE (2) | 146GB IN USE (2) | 146GB IN USE (2) | |
| 1 | 146GB IN USE (1) | 146GB IN USE | 146GB IN USE (3) | 146GB IN USE (3) | 146GB IN USE (3) | 146GB IN USE (3) | |
| 2 | 146GB IN USE (2) | 146GB IN USE ( ) | 146GB IN USE (1) | 146GB IN USE (1) | 146GB IN USE (1) | 146GB SPARE | |
| 3 | 146GB IN USE (4) | 146GB IN USE (4) | 146GB IN USE (4) | 146GB IN USE (4) | 146GB IN USE (4) | 146GB IN USE (4) | |

FIG. 25

DURING DATA REFUSING PROCESSING OF DRIVE B3

| DRIVE NO. \ UNIT ID | A | B | C | D | E | F | |
|---|---|---|---|---|---|---|---|
| 0 | 146GB IN USE (1) | 146GB FAULT | 146GB IN USE (2) | 146GB IN USE (2) | 146GB IN USE (2) | 146GB IN USE (2) | |
| 1 | 146GB IN USE (1) | 146GB IN USE | 146GB IN USE (3) | 146GB IN USE (3) | 146GB IN USE (3) | 146GB IN USE (3) | |
| 2 | 146GB IN USE (2) | 146GB IN USE | 146GB IN USE (1) | 146GB IN USE (1) | 146GB IN USE (1) | 146GB SPARE | |
| 3 | 146GB IN USE (4) | 146GB IN USE (4) | 146GB IN USE (4) | 146GB IN USE (4) | 146GB IN USE (4) | 146GB IN USE (4) | |

FIG. 26

AFTER COMPLETION OF UNIT EXCHANGE PROCESSING

| DRIVE NO. \ UNIT ID | A | B | C | D | E | F |
|---|---|---|---|---|---|---|
| 0 | 146GB IN USE (1) | 146GB FAULT | 146GB IN USE (2) | 146GB IN USE (2) | 146GB IN USE (2) | 146GB IN USE (2) |
| 1 | 146GB IN USE (1) | 146GB NOT IN USE | 146GB IN USE (3) | 146GB IN USE (3) | 146GB IN USE (3) | 146GB IN USE (3) |
| 2 | 146GB IN USE (2) | 146GB NOT IN USE | 146GB IN USE (1) | 146GB IN USE (1) | 146GB IN USE (1) | 146GB SPARE |
| 3 | 146GB IN USE (4) | 146GB NOT IN USE (4) | 146GB IN USE (4) | 146GB IN USE (4) | 146GB IN USE (4) | 146GB IN USE (4) |

FIG. 27

AFETR EXCHANGE OF UNIT B

| DRIVE NO. \ UNIT ID | A | B | C | D | E | F | |
|---|---|---|---|---|---|---|---|
| 0 | 146GB IN USE (1) | 146GB NOT IN USE | 146GB IN USE (2) | 146GB IN USE (2) | 146GB IN USE (2) | 146GB IN USE (2) | |
| 1 | 146GB IN USE (1) | 146GB NOT IN USE | 146GB IN USE (3) | 146GB IN USE (3) | 146GB IN USE (3) | 146GB IN USE (3) | |
| 2 | 146GB IN USE (2) | 146GB NOT IN USE | 146GB IN USE (1) | 146GB IN USE (1) | 146GB IN USE (1) | 146GB SPARE | |
| 3 | 146GB IN USE (4) | 146GB NOT IN USE | 146GB IN USE (4) | 146GB IN USE (4) | 146GB IN USE (4) | 146GB IN USE (4) | |

FIG. 28

DURING DATA REBUILDING OF DRIVE B3

| DRIVE NO. \ UNIT ID | A | B | C | D | E | F | |
|---|---|---|---|---|---|---|---|
| 0 | 146GB IN USE ① | 146GB NOT IN USE | 146GB IN USE ② | 146GB IN USE ② | 146GB IN USE ② | 146GB IN USE ② | |
| 1 | 146GB IN USE ① | 146GB NOT IN USE | 146GB IN USE ③ | 146GB IN USE ③ | 146GB IN USE ③ | 146GB IN USE ③ | |
| 2 | 146GB IN USE ② | 146GB NOT IN USE | 146GB IN USE ① | 146GB IN USE ① | 146GB IN USE ① | 146GB SPARE | |
| 3 | 146GB IN USE ④ | 146GB REBUILDING ④ | 146GB IN USE ④ | 146GB IN USE ④ | 146GB IN USE ④ | 146GB IN USE ④ | |

FIG. 29

AFTER DATA REBUILDING OF DRIVE B3

| UNIT ID<br>DRIVE NO. | A | B | C | D | E | F | |
|---|---|---|---|---|---|---|---|
| 0 | 146GB<br>IN USE<br>① | 146GB<br>SPARE | 146GB<br>IN USE<br>② | 146GB<br>IN USE<br>② | 146GB<br>IN USE<br>② | 146GB<br>IN USE<br>② | |
| 1 | 146GB<br>IN USE<br>① | 146GB<br>SPARE | 146GB<br>IN USE<br>③ | 146GB<br>IN USE<br>③ | 146GB<br>IN USE<br>③ | 146GB<br>IN USE<br>③ | |
| 2 | 146GB<br>IN USE<br>② | 146GB<br>SPARE | 146GB<br>IN USE<br>① | 146GB<br>IN USE<br>① | 146GB<br>IN USE<br>① | 146GB<br>SPARE | |
| 3 | 146GB<br>IN USE<br>④ | 146GB<br>IN USE<br>④ | 146GB<br>IN USE<br>④ | 146GB<br>IN USE<br>④ | 146GB<br>IN USE<br>④ | 146GB<br>IN USE<br>④ | |

FIG. 30

| RAID GROUP NO. | TOTAL CAPACITY (GB) | RAID LEVEL | NORMAL REDUNDANCY | CURRENT REDUNDANCY | GUARANTEED REDUNDANCY | COMPOSING DRIVE | STATE |
|---|---|---|---|---|---|---|---|
| ① | 580GB | RAID5 | 1 | 1 | 1 | A0 B0 C2<br>A1 B1 | NORMAL |
| ② | 580GB | RAID5 | 1 | 0 | 1 | B0 D0 F0<br>C0 E0 | DRIVE A2 :<br>FAULT/<br>DURING<br>REBUILDING |
| ③ | 430GB | RAID5 | 1 | 1 | 0 | C1 E1 F2<br>D1 F1 | NORMAL |
| ④ | 580GB | RAID6 | 2 | 2 | 1 | A3 C3 E3<br>B3 D3 F3 | NORMAL |
| ⑤ | 280GB | RAID0 | 0 | 0 | 0 | G0 G1 | NORMAL |

RAID GROUP STATE MANAGEMENT TABLE

1917b

DISK ARRAY INCLUDING PLURAL EXCHANGEABLE MAGNETIC DISK UNIT

CLAIM OF PRIORITY

The present application claims priority from Japanese application P2004-68348 filed on Mar. 11, 2004, the content of which is hereby incorporated by reference into this application.

BACKGROUND

The present invention relates to a storage apparatus implementing a RAID configuration. In particular, a disk array apparatus in which a plurality of units, each of which includes a plurality of drives, are mounted.

In order to achieve space saving and high density mounting of drives, there has been proposed a disk array apparatus in which a plurality of units (disk blades), each of which includes a plurality of physical drives, are mounted (refer to JP 09-016343 A).

SUMMARY

In the above-mentioned conventional disk array apparatus, the plurality of drives in each of the units are made to appear to be a single drive. However, because each of the units is treated as the signal drive in such a structure, a plurality of RAID groups cannot be constructed on each of the units, raising a problem of low flexibility in the structure.

Further, it is technically possible to construct a plurality of RAID groups on each of the units. However, it is not considered to manage a relationship between a unit and a drive in the unit. When a unit in which a fault occurs is exchanged for another unit, it cannot be expected how the exchange affects other RAID groups, so that maintenance and exchange of the unit are difficult.

An object of the present invention is to provide a storage apparatus in which a plurality of drives in a unit are separately treated and the unit can be easily exchanged for another unit even when RAID groups are freely composed.

According to the present invention, a storage apparatus comprises a plurality of drive cases in each of which a plurality of units are detachably mounted, each of the units including a plurality of drives that are detachably attachable, and a controller case in which a disk control unit is provided, wherein the disk control unit comprises a RAID group creation unit for creating a RAID group using the plurality of disks and an exchangeability indicating unit for giving a notice that a unit is ready to exchange after rebuilding or copying of data in disks included in the unit at the time of exchange of the unit.

According to the present invention, a plurality of physical drives included in a unit can be separately treated to freely configure a RAID group. In addition, detachment and exchange on each of the unit are facilitated.

BRIEF DESCRIPTION OF THE DRAWINGS

FIG. 8 is an explanatory diagram showing a drive setting content holding table according to the first embodiment of the present invention.

FIG. 9 is an explanatory diagram showing a drive state management table according to the first embodiment of the present invention.

FIG. 10 is an explanatory diagram showing a RAID group state management table according to the first embodiment of the present invention.

FIG. 18 is an explanatory diagram showing the drive state management table (before occurrence of fault) according to the first embodiment of the present invention.

FIG. 19 is an explanatory diagram showing the drive state management table (during data rebuilding) according to the first embodiment of the present invention.

FIG. 20 is an explanatory diagram showing the drive state management table (after data rebuilding) according to the first embodiment of the present invention.

FIG. 21 is an explanatory diagram showing the drive state management table (during data copying) according to the first embodiment of the present invention.

FIG. 22 is an explanatory diagram showing the drive state management table (after data refuging) according to the first embodiment of the present invention.

FIG. 23 is an explanatory diagram showing the drive state management table (during data copying) according to the first embodiment of the present invention.

FIG. 24 is an explanatory diagram showing the drive state management table (after data refuging) according to the first embodiment of the present invention.

FIG. 25 is an explanatory diagram showing the drive state management table (during refuging processing) according to the first embodiment of the present invention.

FIG. 26 is an explanatory diagram showing the drive state management table (after completion of unit exchange processing) according to the first embodiment of the present invention.

FIG. 27 is an explanatory diagram showing the drive state management table (after unit changing) according to the first embodiment of the present invention.

FIG. 28 is an explanatory diagram showing the drive state management table (during data rebuilding) according to the first embodiment of the present invention.

FIG. 29 is an explanatory diagram showing the drive state management table (after data rebuilding) according to the first embodiment of the present invention.

FIG. 30 is an explanatory diagram showing a RAID group state management table according to a second embodiment of the present invention.

DETAILED DESCRIPTION OF THE PREFERRED EMBODIMENTS

Embodiments of the present invention will be described below with reference to the accompanying drawings.

First Embodiment

Figure 1:
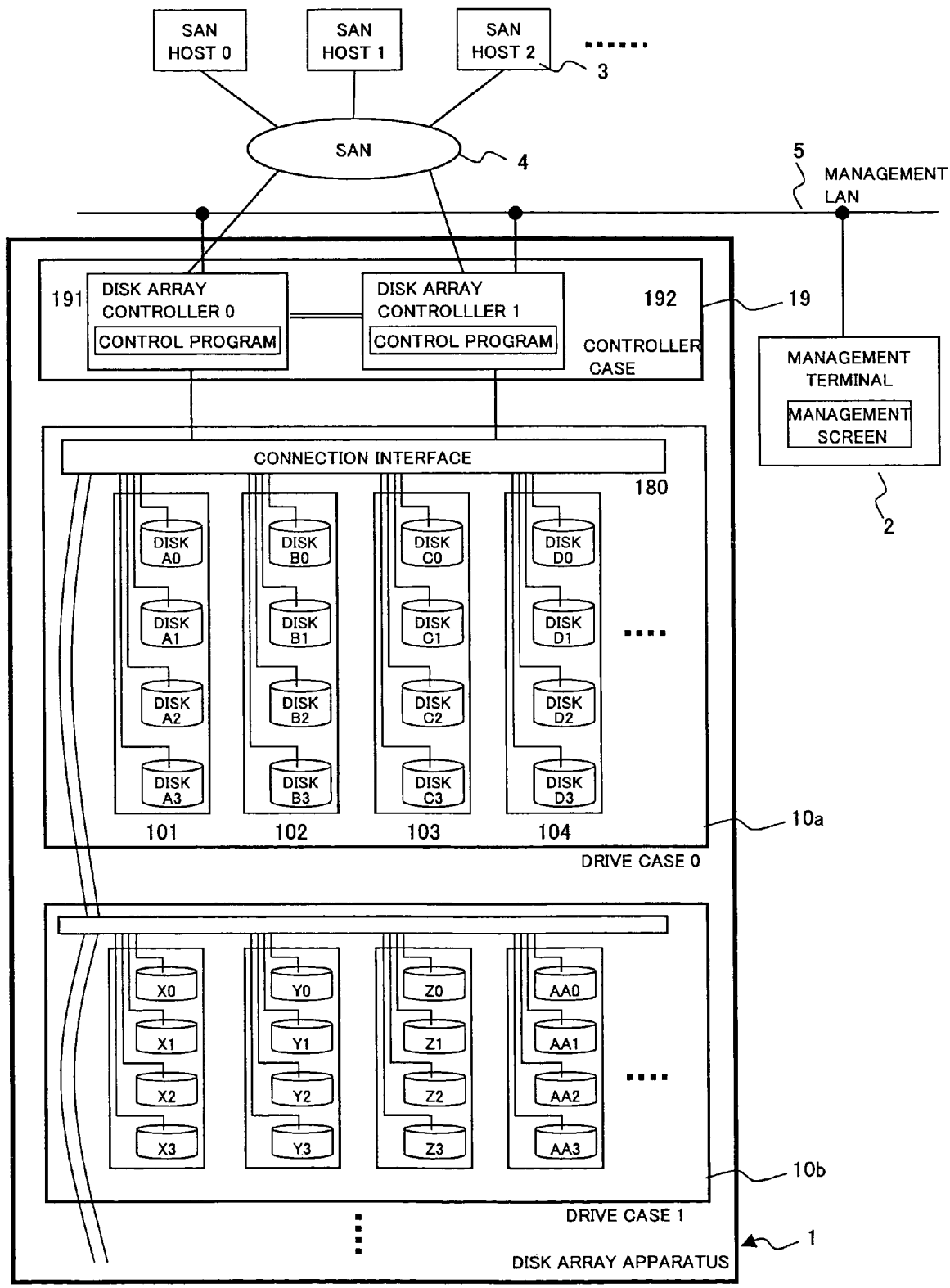
FIG. 1 is a block diagram showing a structure of a disk array apparatus according to a first embodiment of the present invention.

FIG. 1 is a block diagram showing a structure of a disk array apparatus according to a first embodiment of the present invention.

A disk array apparatus 1 according to the first embodiment of the present invention has a plurality of drive cases 10a and 10b and a controller case 19. The disk array apparatus 1 is connected with a management terminal 2 through a management LAN 5. In addition, the disk array apparatus 1 is connected with a plurality of SAN hosts 3 through a SAN 4.

A plurality of units (disk blades) 101, 102, 103, and 104 are mounted in the drive case 10a. Each of the disk blades includes a plurality of drives (four drives in this embodiment). For example, the disk blade 101 includes disks A0 to A3. The disk A0 and the like which are mounted in the drive case 10a using the disk blade 101 are connected with a connection interface 180 and can transmit and receive data to and from a disk array controller 191 and the like. An interface such as an ATA (AT Attachment), a SAS (Serial Attached SCSI), or a Fibre Channel can be used as the connection interface 180.

The controller case 19 is provided with disk array controllers 191 and 192. A control program operates in the disk array controller 191 or the like to control data input/output to and from the disk A0 and the like. A RAID configuration implemented by the disk A0 and the like which are mounted in the disk array apparatus 1 is managed according to the control program. Because the controller case 19 is provided with the plurality of disk array controllers 191 and 192, the disk array controllers 191 and 192 simultaneously input/output a large amount of data to and from the SAN 4.

The controller case 19 is provided with a power supply unit which supplies electric power to each unit in the disk array apparatus 1.

According to a structure of the apparatus, the disk array controller 191 may be singly provided, or the controller case 19 and the drive case 10a may be provided as a single case.

The management terminal 2 is a computer apparatus including a CPU, a memory, a storage device, an interface, an input device, and a display device. A management program operates in the management terminal 2. According to the management program, an operating state of the disk array apparatus 1 is checked for controlling the operation of the disk array apparatus 1. Because a client program such as a web browser operates in the management terminal 2, the operation of the disk array apparatus 1 may be controlled according to a management program (Common Gateway Interface, Java, or the like) supplied from the disk array apparatus 1.

Each of the SAN hosts 3 is a computer apparatus including a CPU, a memory, a storage device, and an interface, and allows uses of a database service, a web service, and the like by using data supplied from the disk array apparatus 1.

The SAN 4 is a network which allows communications via a protocol suitable for data transfer, such as a Fibre Channel protocol.

The management LAN 5 allows communications of data and control information between computers via, for example, a TCP/IP protocol. For example, an Ethernet is used.

Figure 2:
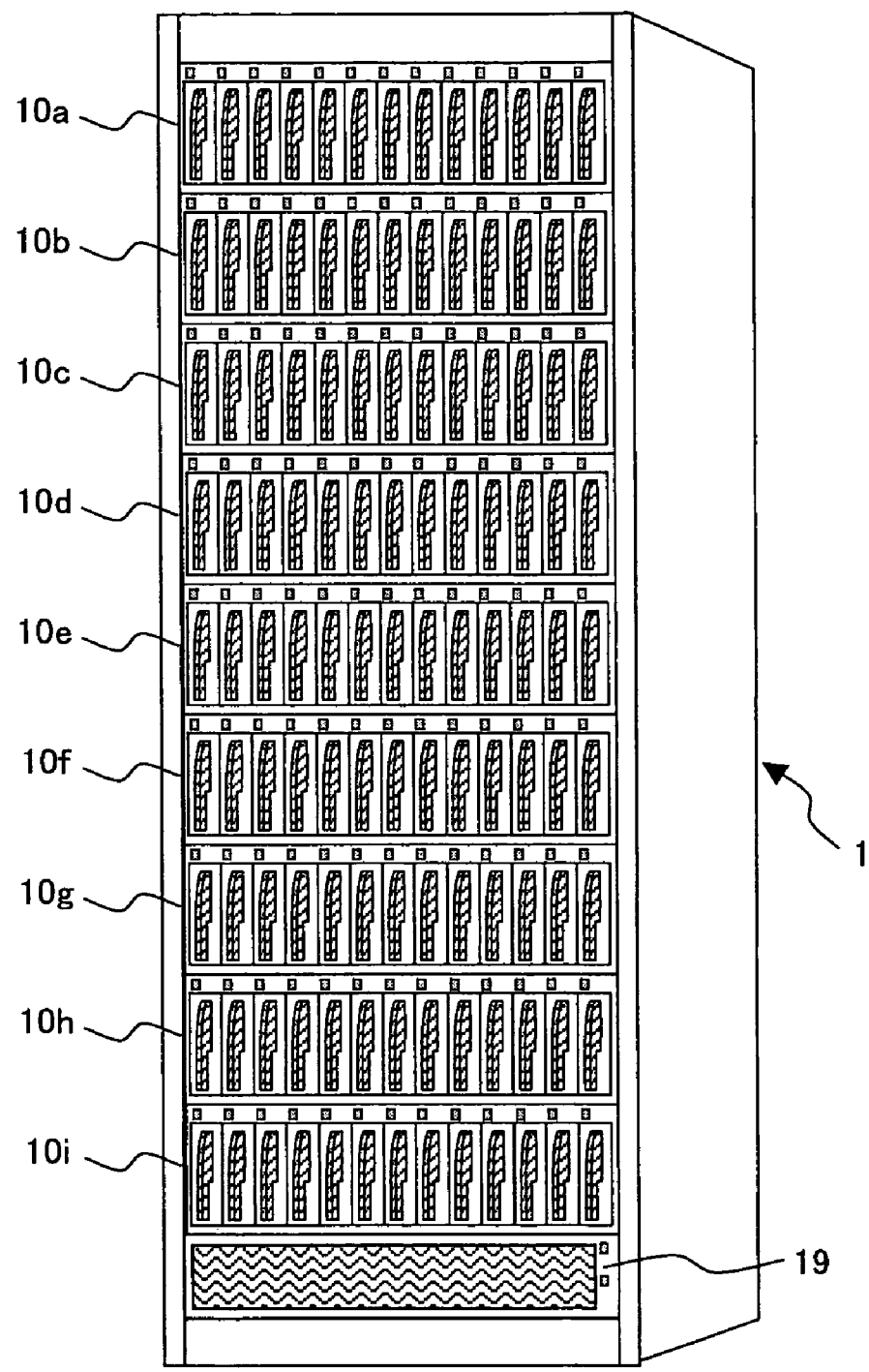
FIG. 2 is an external view showing the structure of the disk array apparatus according to the first embodiment of the present invention.

FIG. 2 is an external view showing the structure of the disk array apparatus according to the first embodiment of the present invention.

The disk array apparatus 1 according to the first embodiment of the present invention is stored in a 19-inch rack. Plural stages of drive cases (enclosures), each of which stores a plurality of disk blades including disks are provided in an upper portion of the disk array apparatus 1. A power source unit (not shown) that supplies power to drives in a corresponding drive case and the connection interface 180 are provided on the rear side of each of the drive cases 10a to 10i. The connection interface 180 and the respective disk blades are physically connected with one another through a wiring board (back plane) provided in each of the drive cases. As shown in FIG. 1, the respective disk blades are connected with the disk array controller 191, the drive case 10a, and the like.

The controller case 19 that stores the disk array controllers 191 and 192 and a cooling fan unit for cooling the disk array controllers 191 and 192 are provided below the drive cases.

Figure 3:
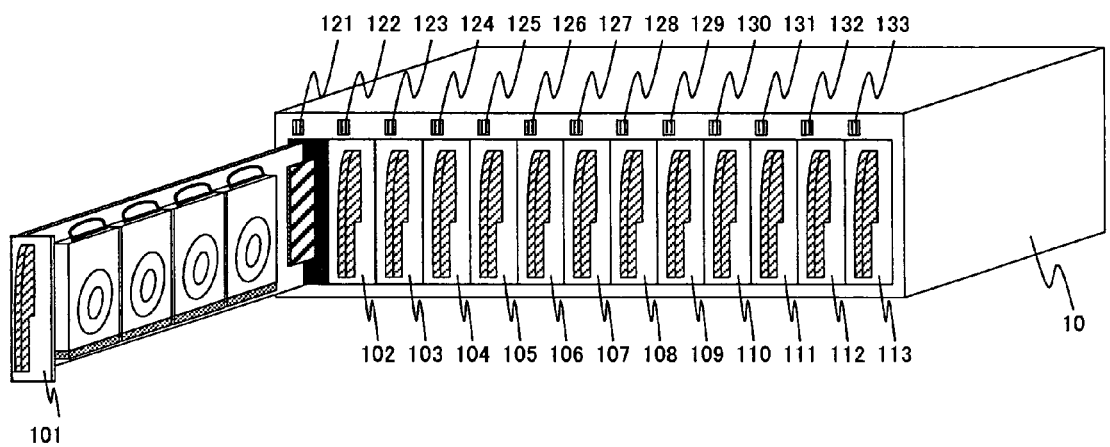
FIG. 3 is a perspective view showing a drive case composing the disk array apparatus according to the first embodiment of the present invention.

FIG. 3 is a perspective view showing the drive case 10a composing the disk array apparatus 1 according to the first embodiment of the present invention.

A plurality of disk blades 101 to 113 is attachable to the drive case 10a. The disk blades are stored in the drive case by sliding along a rail provided in the drive case.

Unit exchange indicators 121 to 133 are provided above the disk blades 101 to 113 in the drive case 10a. When a disk blade becomes ready to detach, the unit exchange indicator corresponding to the disk blade is turned on to give a notice, thereby facilitating maintenance and exchanging operations.

Figure 4:
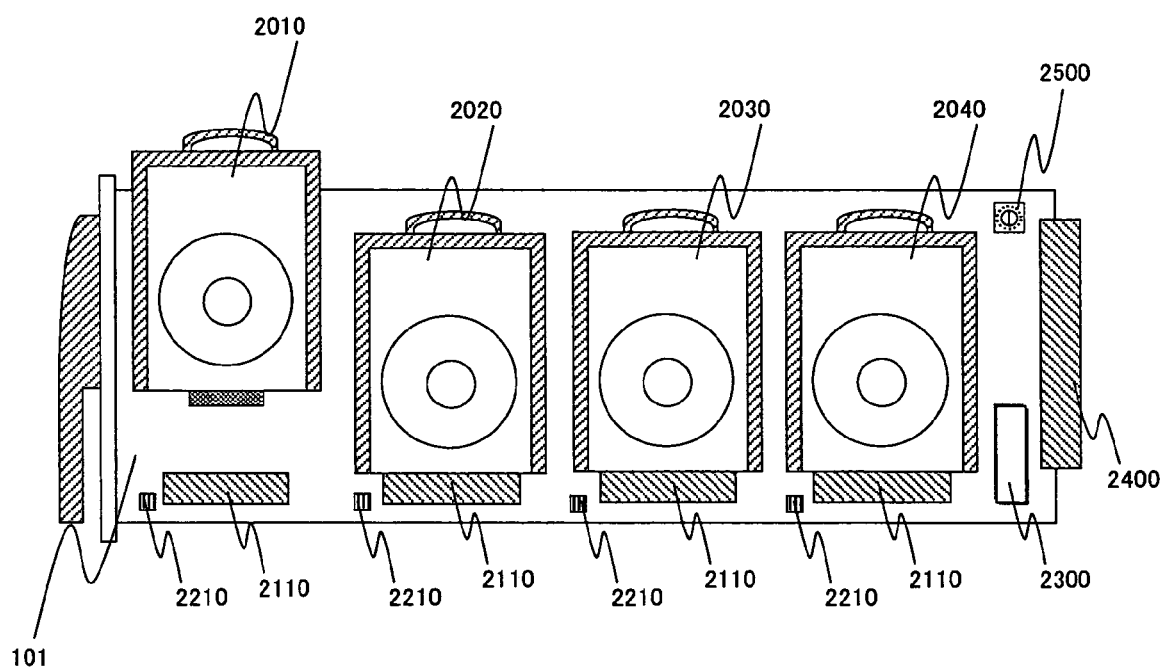
FIG. 4 is a structural view showing a disk blade composing the disk array apparatus according to the first embodiment of the present invention.

FIG. 4 is an explanatory view showing a structure of the disk blade 101 composing the disk array apparatus according to the first embodiment of the present invention.

A plurality of drives 2010 to 2040 are attached to the disk blade 101. The drives 2010 to 2040 are attached to holding frames (canisters) attachable to the disk blade 101 and constructed so as to be detached from the disk blade 101 together with the canisters. A connector is provided in the rear end of each of the drives 2010 to 2040. The connector is fitted into a connector 2110 provided in the disk blade 101 to thereby connect between the drives 2010 to 2040 and the disk blade 101.

Drive exchange indicators 2210 comprises LEDs, and are provided in the disk blade 101. When the drives 2010 to 2040 (canisters) becomes ready to detach, the drive exchange indicator 2210 corresponding to the drive is turned on to give a notice, thereby facilitating maintenance and exchanging operations. The drive exchange indicators 2210 are driven by an LED control circuit 2300. The LED control circuit 2300 turns on the drive exchange indicators 2210 based on instructions from the disk array controllers 191 and 192.

Even after the disk blade 101 is detached from the drive case 10a (that is, even after power from the disk array apparatus 1 stops), the drive exchange indicators 2210 can stay tuned on. Therefore, the LED control circuit 2300 includes a memory circuit (for example, flip-flop) that holds the instructions from the disk array controllers 191 and 192 and a power source circuit (for example, rechargeable battery or capacitor) that supplies power applied to the drive exchange indicators 2210. As described above, even after the disk blade 101 is detached from the drive case 10a, the drive exchange indicators 2210 stay turned on. Thus, even after the disk blade 101 is detached from the drive case 10a, a drive to be exchanged can be checked.

A connector 2400 is bonded to a back end of the disk blade 101. The connector 2400 is fitted into a connector provided in the back plane to thereby connect between the disk blade 101 and the back plane.

A rotary switch 2500 is provided in the disk blade 101. When a unit ID is set using the rotary switch 2500, discrimination among the disk blades mounted in the same drive case can be electrically made. The rotary switch 2500 thus functions as a unit ID setting unit.

Figure 5:
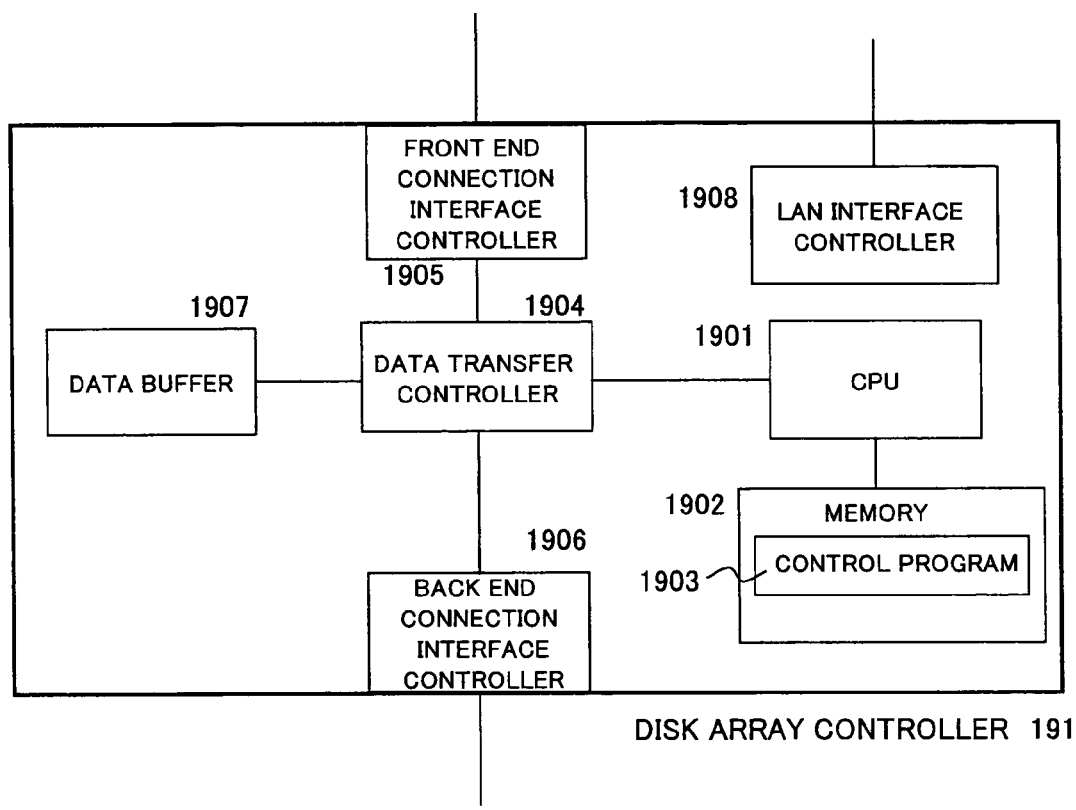
FIG. 5 is a block diagram showing a structure of a disk array controller according to the first embodiment of the present invention.

FIG. 5 is a block diagram showing the structure of the disk array controller 191 according to the first embodiment of the present invention.

The disk array controller 191 includes a CPU 1901, a memory 1902, a data transfer controller 1904, a front end connection interface controller 1905, a back end connection interface controller 1906, a data buffer 1907, and a LAN interface controller 1908.

Figure 6:
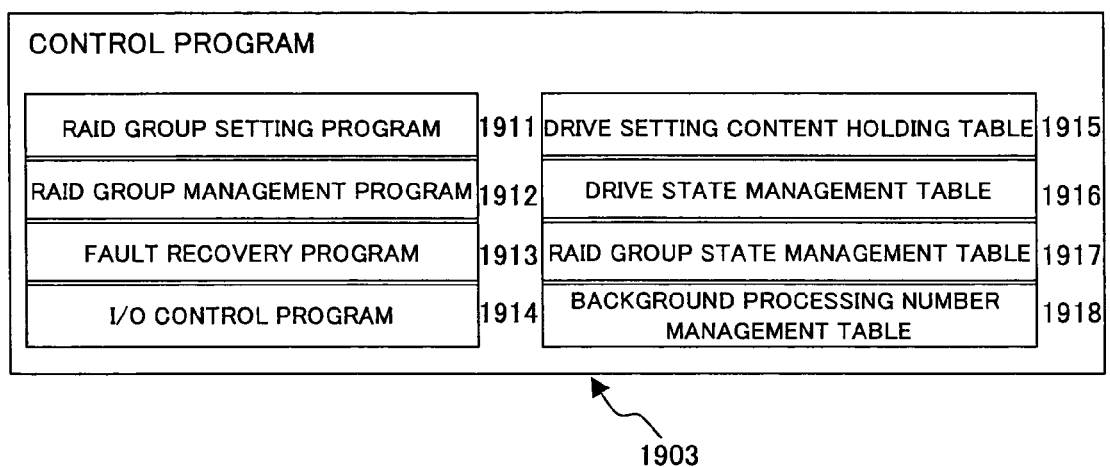
FIG. 6 is an explanatory diagram showing a control program according to the first embodiment of the present invention.

The memory 1902 stores a control program 1903 (see FIG. 6). The CPU 1901 calls and executes the control program 103 to execute various processings.

The data transfer controller 1904 transfers data among the CPU 1901, the front end connection interface controller 1905, the back end connection interface controller 1906, and the data buffer 1907.

The front end connection interface controller 1905 is an interface to the SAN 4 and transmits and receives data and control signals to and from the SAN hosts 3 via, for example, a Fibre Channel protocol.

The back end connection interface controller 1906 is an interface to the connection interface 180 and transmits and receives data and control signals to and from the disks through an interface such as an ATA, a SAS, or a Fibre Channel.

The data buffer 1907 includes a cache for temporarily storing data which is transmitted and received between the front end connection interface controller 1905 and the back end connection interface controller 1906.

Therefore, the data transfer controller 1904 transfers between the interfaces 1905 and 1906 data which are read from and written to the disks through the SAN 4. In addition, the data transfer controller 1904 transfers the data which are read from and written to the disks to the data buffer 1907.

The LAN interface controller 1908 is an interface to the management LAN 5 and can transmit and receive data and a control signal to and from the management terminal 2 via, for example, an Ethernet protocol.

FIG. 6 is an explanatory diagram showing the control program 1903 according to the first embodiment of the present invention.

The control program 1903 includes a RAID group setting program 1911, a RAID group management program 1912, a fault recovery program 1913, and an I/O control program 1914. In order to operate these programs, a drive setting content holding table 1915, a drive state management table 1916, a RAID group state management table 1917, and a background processing number management table 1918 are stored.

Figure 13:
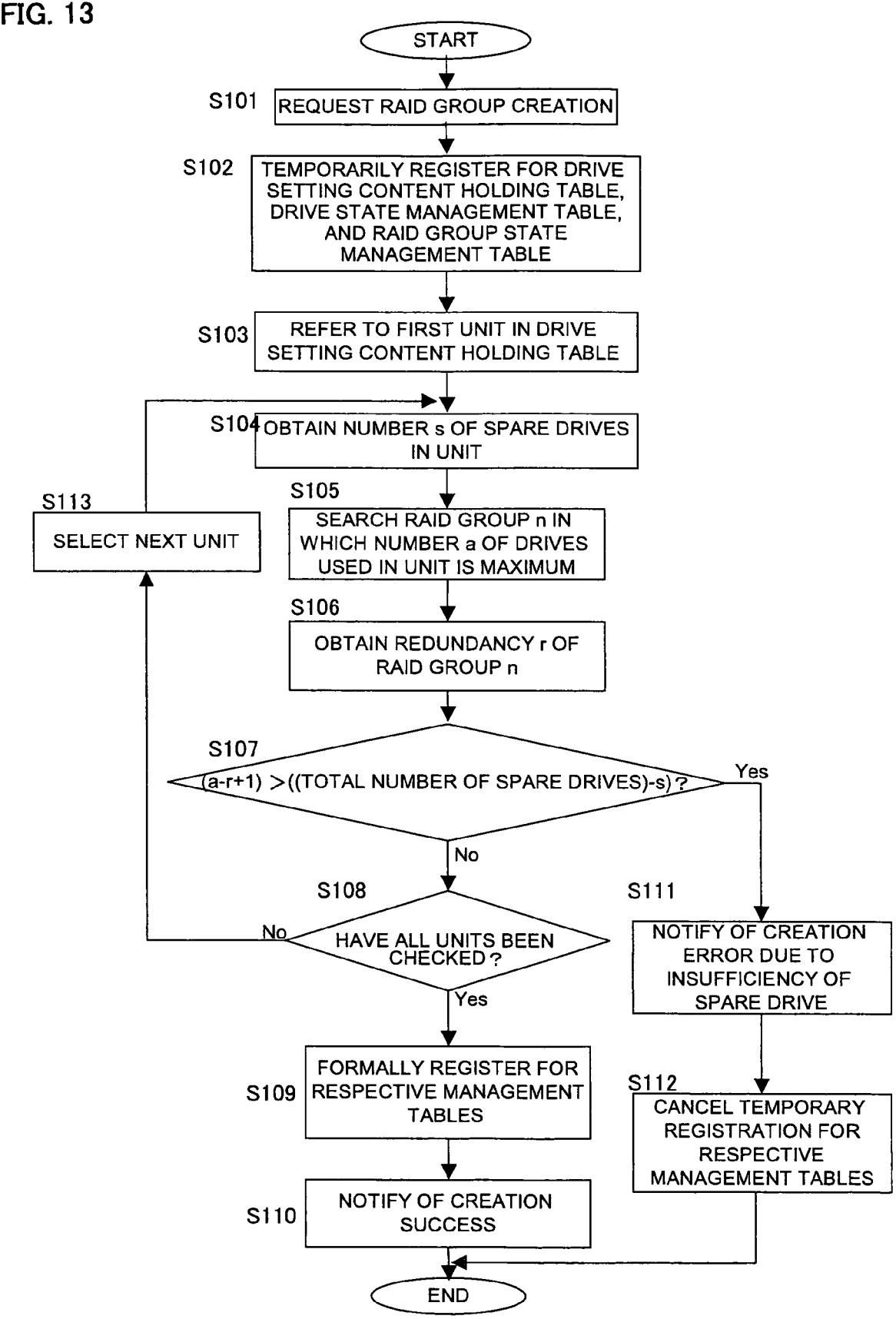
FIG. 13 is a flow chart showing RAID group creation processing according to the first embodiment of the present invention.

By the RAID group setting program 1911, the CPU 1901 executes processing for setting a RAID configuration using the drives mounted in the disk array apparatus 1 by the RAID group setting program 1911 (for example, see FIG. 13).

By the RAID group management program 1912, the CPU 1901 maintains and manages of the RAID configuration set by the RAID group setting program 1911.

Figure 14:
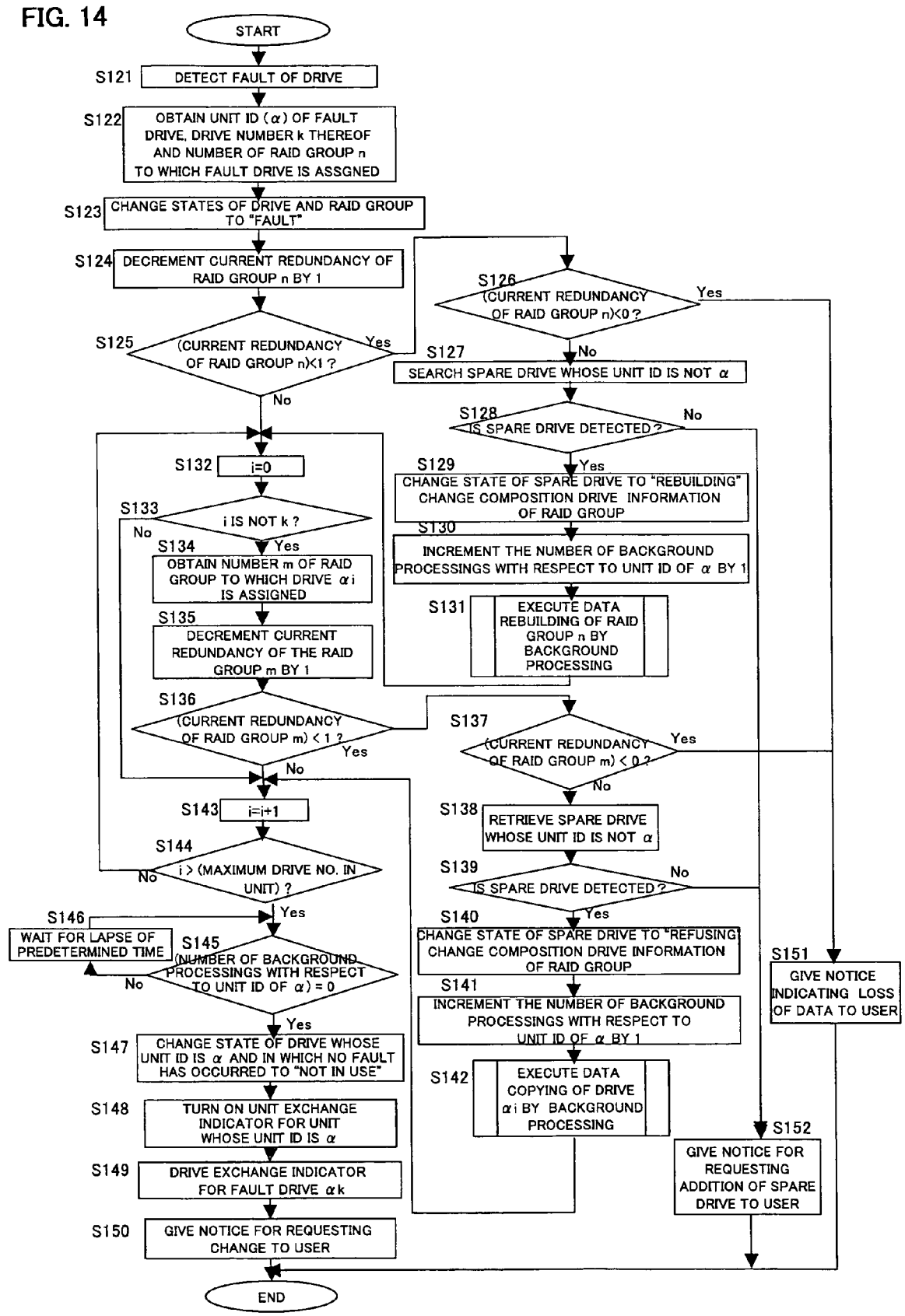
FIG. 14 is a flow chart showing unit exchange processing according to the first embodiment of the present invention.
Figure 15:
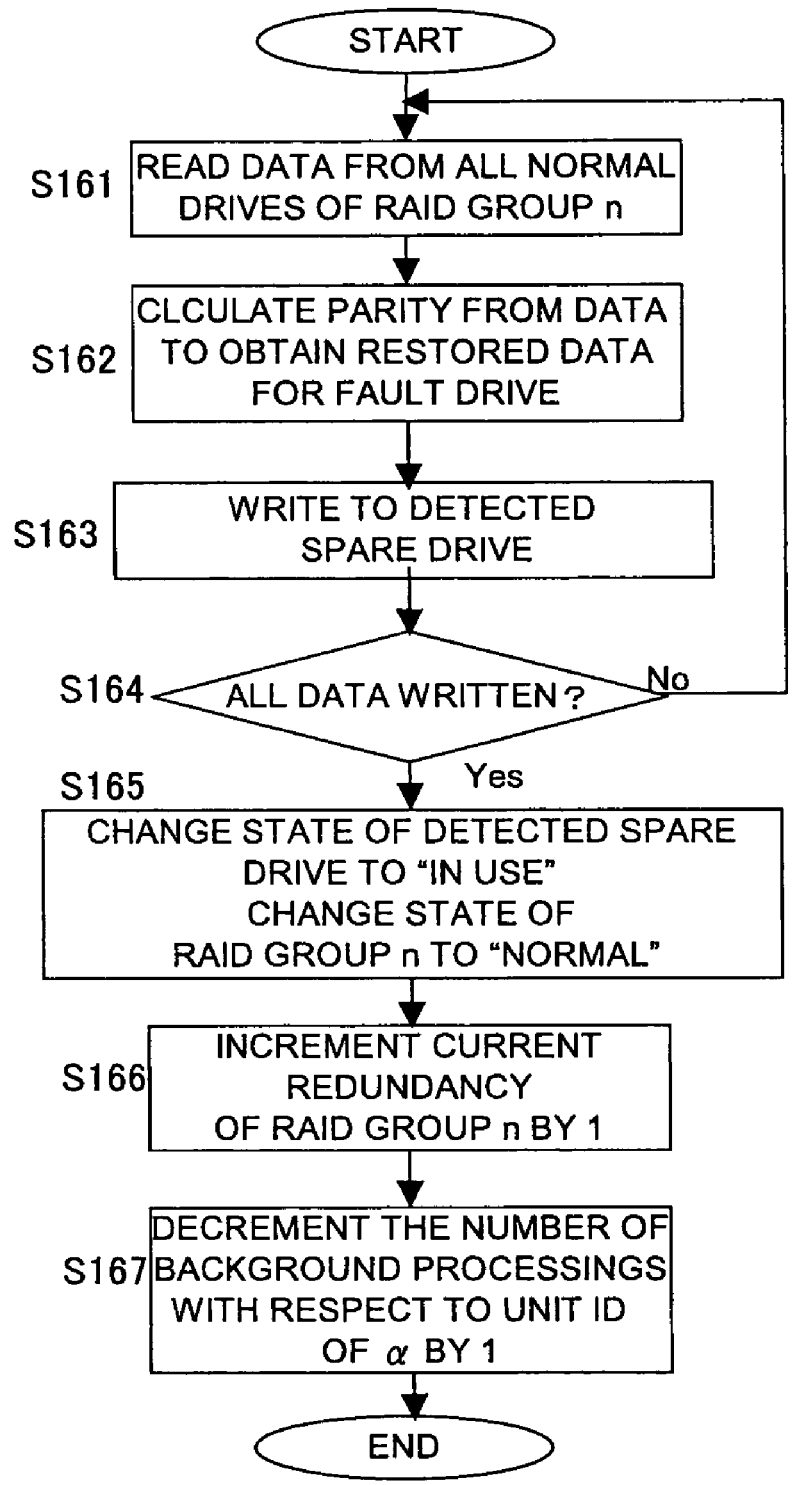
FIG. 15 is a flow chart showing data rebuilding processing to a RAID group according to the first embodiment of the present invention.
Figure 16:
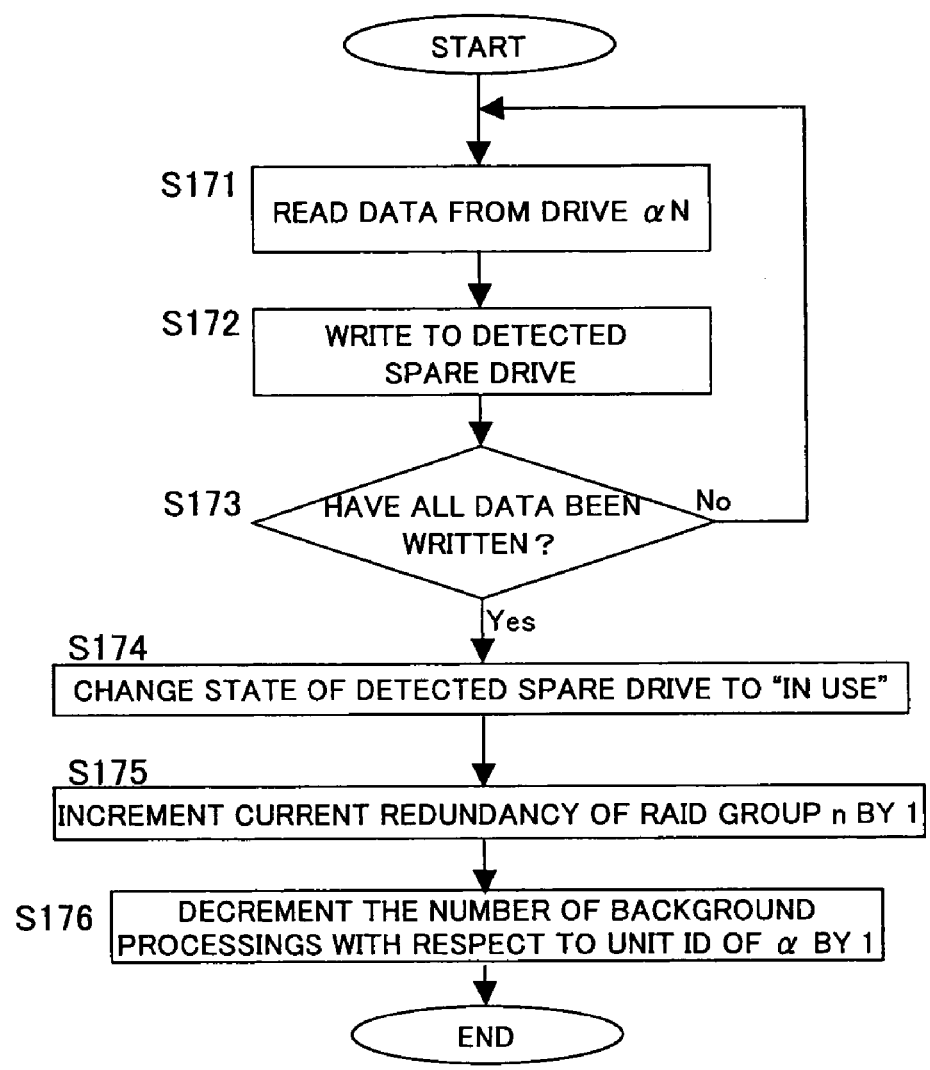
FIG. 16 is a flow chart showing data copying processing for a drive according to the first embodiment of the present invention.

By the fault recovery program 1913, the CPU 1901, monitors the fault in the drives mounted in the disk array apparatus 1 and executes of processing with respect to a drive in which the fault is caused and the drives included in the same unit as the drive in which the fault is caused (for example, see FIGS. 14, 15, and 16).

By the I/O control program 1914, the CPU 1901 executes processing with respect to reading of data from and writing of data to the drives mounted in the disk array apparatus 1.

Next, various tables used during the operations of the control program will be described.

Figure 7:
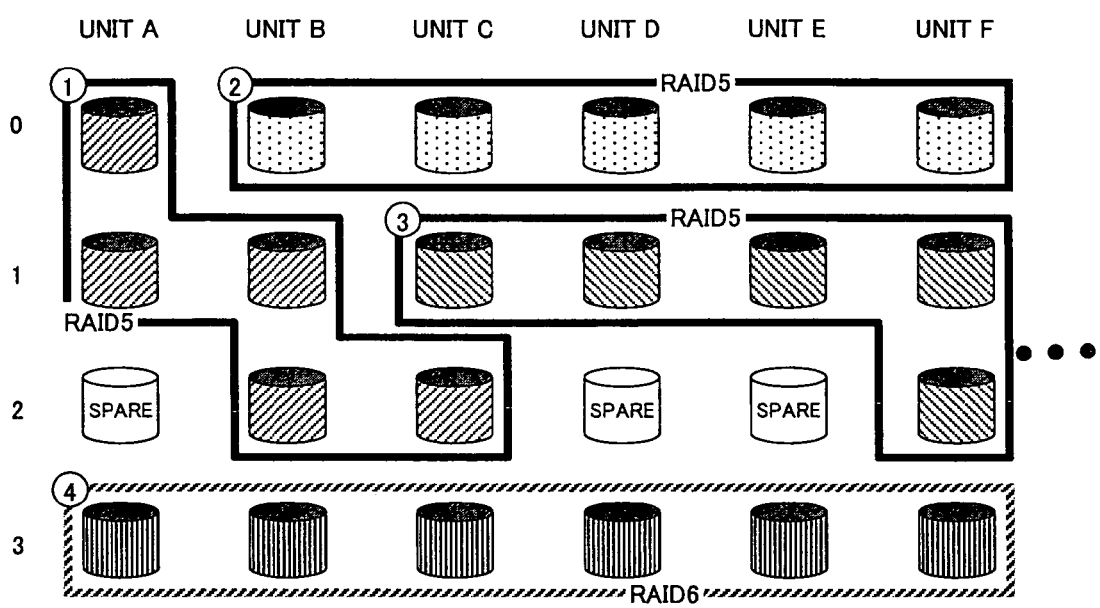
FIG. 7 is an explanatory diagram showing a RAID configuration according to the first embodiment of the present invention.

FIG. 7 is an explanatory diagram showing a RAID configuration implemented by the disks attached to the disk array apparatus 1 according to the first embodiment of the present invention.

For example, a RAID group 1 includes five drives, that is, a drive A0 (unit ID is A and drive number is 0), a drive A1, a drive B1, a drive B2, and a drive C2, thereby composing a RAID group of level 5. In addition, a RAID group 4 includes six drives such as a drive A3, a drive B3, a drive C3, a drive D3, a drive E3, and a drive F3, thereby composing a RAID group of level 6.

FIG. 8 is an explanatory diagram showing the drive setting content holding table 1915 according to the first embodiment of the present invention.

A state set to each of the drives included in each of the disk blades is recorded on each of the drive in the drive setting content holding table 1915. Specifically, a storage capacity of each drive, a usage state ("in use" or "spare" which is not in use) of the drive, a RAID number of a RAID group to which the drive is assigned are recorded. More specifically, "1" is recorded in each of RAID number fields of the five drives such as the drive A0, the drive A1, the drive B1, the drive B2, and the drive C2, so that these drives are assigned to the RAID group 1.

FIG. 9 is an explanatory diagram showing the drive state management table 1916 according to the first embodiment of the present invention.

A current state of each of the drives included in each of the disk blades is recorded on each of the drive in the drive state management table 1916. More specifically, a storage capacity of each drive, a state ("in use", "fault" which is caused, "rebuilding" which is executing rebuilding process, "refuging" which is executing refuging processing, or "spare" which is not in use) of the drive, a RAID number of a RAID group to which the drive is assigned are recorded. For example, the drive B0 is a drive assigned to a RAID group 2 and a fault has occurred in the drive B0.

FIG. 10 is an explanatory diagram showing the RAID group state management table 1917 according to the first embodiment of the present invention.

A total storage capacity, a RAID level (type of RAID configuration), a normal redundancy, a current redundancy, identification numbers of drives composing a RAID group, and a state of the RAID group are recorded for each set RAID group in the RAID group state management table 1917.

For example, the drives composing the RAID group 1 are five drives A0, A1, B1, B2, and C2. These drives (that is, the RAID group 1) operate in a normal state. On the other hand, the drives composing the RAID group 2 are five groups B0, C0, D0, E0, and F0. As shown in the drive state management table 1916 (FIG. 9), the fault has occurred in the drive B0, so that the RAID group 2 becomes a "fault" state. Thus, the normal redundancy of the RAID group 2 is one but the current redundancy reduces to zero.

Figure 11:
FIG. 11 is an explanatory diagram showing a background processing number management table according to the first embodiment of the present invention.

FIG. 11 is an explanatory diagram showing the background processing number management table 1918 according to the first embodiment of the present invention.

The background processing number management table 1918 shows disk blades (unit IDs) and the number of background processings executed in the disks included in each of the disk blades. That is, as described later, when the rebuilding processing starts after a fault occurs in a disk, the number of background processings increments (step S130 shown in FIG. 14). When the rebuilding processing is complete, the number of background processings decrements (step S167 shown in FIG. 15). In addition, when data copying processing starts after a fault occurs in a disk, the number of background processings increments (step S141 shown in FIG. 14). When the data copying processing is complete, the number of background processings decrements (step S176 shown in FIG. 16). In step S145 shown in FIG. 14, the background processing number management table 1918 is also used to judge whether a unit may be detached (a unit in which the background processing is maintained cannot be detached).

Figure 12:
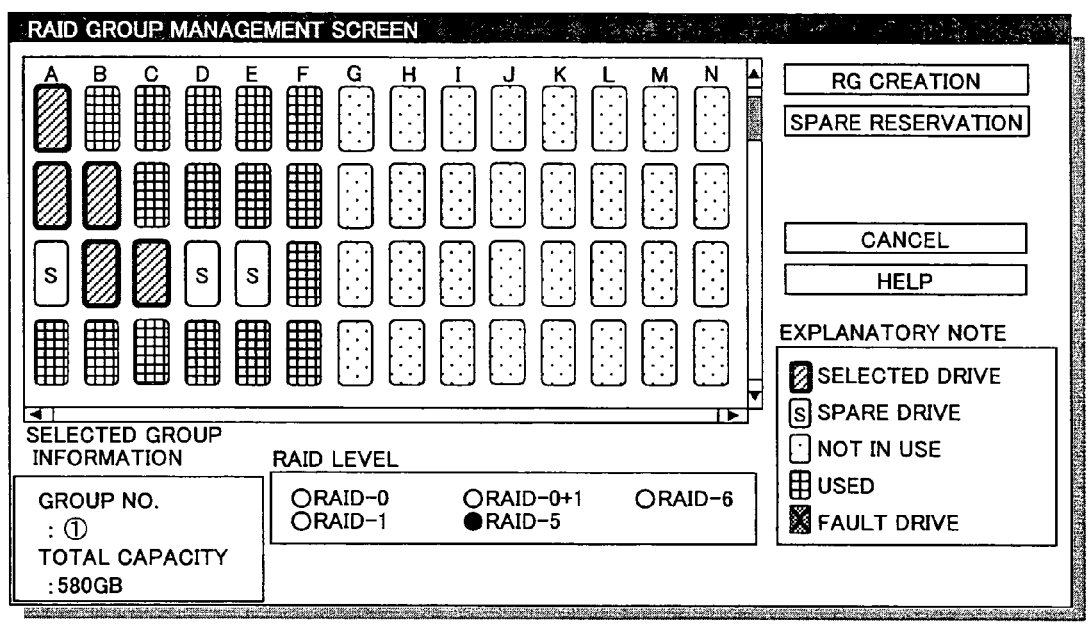
FIG. 12 is an explanatory view showing a RAID group management screen displayed on a management terminal according to the first embodiment of the present invention.

FIG. 12 is an explanatory view showing a RAID group management screen displayed on the management terminal 2 according to the first embodiment of the present invention.

The RAID group management screen is displayed when an administrator selects a RAID group. The selected RAID group is displayed on a field of "selected group information" provided at the lower left of the RAID group management screen. The state of a disk is displayed on the RAID group management screen for each disk included in each of the disk blades.

An administrator selects drives composing a RAID group, so that the RAID group can be configured. An administrator can set the selected drive as "spare" which does not comprise the RAID group.

FIG. 13 is a flow chart showing RAID group creation process according to the first embodiment of the present invention. The CPU 1901 executes the RAID group creation processing by using the RAID group setting program 1911.

According to the RAID group setting program 1911, when a RAID group creation request is received from the management terminal 2 (S101), the CPU 1901 temporarily registers a requested RAID group to the drive setting content holding table 1915, the drive state management table 1916, and the RAID group state management table 1917 (S102).

After that, the CPU 1901 refers to a unit described first in the drive setting content holding table 1915 (S103) and obtains a number s of drives which become spares in the unit (S104). The CPU 1901 searches a RAID group n which has a maximum number a of drives in the unit (S105). Then, the CPU 1901 obtains a redundancy r of the searched RAID group n with referred to the RAID group state management table 1917 (S106).

After that, the CPU 1901 compares (a−r+1) with ((the total number of spare drives)−s) to judges whether drives necessary to maintain the minimum redundancy remain as spares after the detachment of a unit (S107).

As a result of the judgment, when (a−r+1)>((the total number of spare drives)−s), the CPU 1901 determines that the number of spare drives necessary to maintain the minimum redundancy is insufficient in the case where the unit is detached. The CPU 1901 gives a notice of a RAID creation error due to the insufficiency of the spare drive (S111). Then, the CPU 1901 cancels the temporary registration of the respective management tables created in step S102 (S112).

On the other hand, when (a−r+1)≦((the total number of spare drives)−s), the CPU 1901 determines that the number of spare drives necessary to maintain the minimum redundancy is sufficient even in the case where the unit is detached. Then, the CPU 1901 judges whether all units have been checked (S108).

As a result, when checking of all units is not complete, the processing goes to step S113. The next, the CPU 1901 selects a unit to be checked, and checks an influence at the time of detachment of the selected unit (S104 to S107).

On the other hand, when the checking of all units is complete, the CPU 1901 formally registers the temporary registration of the respective management tables created in step S102 to the respective tables (S109). Then, a notice of a creation success of the RAID group is sent to the management terminal 2 (S110).

FIG. 14 is a flow chart showing unit exchange process at a time when a fault occurs in a drive according to the first embodiment of the present invention. The CPU 1901 executes the unit exchange processing by using the fault recovery program 1913.

When a fault of a drive is detected (S121), the CPU 1901 obtains a unit ID (α) of the fault drive, a drive number k thereof, and a number n of the RAID group to which the fault drive is assigned, and refers to the drive state management table 1916 (S122). Then, by the CPU 1901, the state of the drive k which is recorded in the drive state management table 1916 is changed to "fault", and the state of the RAID group n recorded in the RAID group state management table 1917 is changed to "fault" (S123). The CPU 1901 decrements current redundancy of the RAID group n which is recorded in the RAID group state management table 1917, by one (S124).

In step S125, the CPU 1901 judges whether the current redundancy of the RAID group n is smaller than one (becomes zero).

As a result, when the current redundancy of the RAID group n is equal to or larger than one, the CPU 1901 determines that a minimum required redundancy is maintained. Then, the CPU 1901 initializes a variable i of the drive number, in order to check drives mounted in the same unit as the fault drive (S132). When the current redundancy of the RAID group n is smaller than 1, the processing goes to step S126.

In step S126, the CPU 1901 judges whether the current redundancy of the RAID group n is smaller than zero (becomes a negative value).

As a result, when the current redundancy of the RAID group n is smaller than zero, a notice indicating that no RAID configuration comprises and it occurs that data is lost is sent to a user (S151).

On the other hand, when the current redundancy of the RAID group n is equal to or larger than zero, the CPU 1901 searches a drive which becomes a spare, from units having unit IDs other than a (S127). As a result of the search, when the spare drive is not detected (S128), a notice for requesting the addition of a spare drive is sent to the user (S152). As a result of the search, when the spare drive is detected (S128), the CPU 1901 changes the state of the spare drive in the drive state management table 1916 to "rebuilding". In addition, instead of information of the fault drive, the CPU 1901 adds information of the detected spare drive as composition drive information to the RAID group state management table 1917 (S129). The CPU 1901 increments number of background processings which is recorded in the background processing number management table 1918 with respect to the unit ID of $\alpha$ by one (S130). After that, the CPU 1901 executes data rebuilding of the RAID group n by the background processing (S131). The CPU 1901 initializes the variable i of the drive number (S132).

In step S133, when the variable i is initialized in step S132, the CPU 1901 compares the variable i with the drive number k of the fault drive which is obtained in step S122. As a result, when i=k, the CPU 1901 judges that a fault has occurred in this drive, and the processing goes to step S143. The CPU 1901 increments the variable i of the drive number by one and executes checking of the next drive. When i≠k, the CPU 1901 judges that no fault has occurred in this drive, and the CPU 1901 obtains a number m of a RAID group to which a drive $\alpha i$ (the unit ID is $\alpha$ and the drive number is i) is assigned (S134). The CPU 1901 decrements the current redundancy of the RAID group m corresponding to the obtained number in the RAID group state management table 1917 by one (S135).

In step S136 the CPU 1901 judges whether the current redundancy of the RAID group m is smaller than one (becomes zero).

As a result of the determination, when the current redundancy of the RAID group m is equal to or larger than one, the CPU 1901 determines that the minimum required redundancy is maintained. Then, the CPU 1901 increases a variable i of the drive number by one, in order to check the next drive (S143). When the current redundancy of the RAID group m is smaller than 1, the processing goes to step S137.

In step S137, the CPU 1901 judges whether the current redundancy of the RAID group m is smaller than zero (becomes a negative value).

According to the processings of steps S136 and S137, a change in state of the RAID resulting from drives included in the unit whose unit ID is $\alpha$ is estimated the influence on the RAID group to which drives in which the no fault has occurred are assigned is estimated when the unit (unit ID is $\alpha$) is detached.

As a result, when the current redundancy of the RAID group m is smaller than zero, a notice indicating that no RAID configuration comprises and data lost occurs is sent to a user (S151).

On the other hand, when the current redundancy of the RAID group n is equal to or larger than zero, the CPU 1901 searches a drive which becomes a spare, from units having unit IDs other than $\alpha$ (S138). As a result of the search, when the spare drive is not detected (S139), a notice for requesting the addition of a spare drive is sent to the user (S152). As a result of the search, when the spare drive is detected (S139), the CPU 1901 changes the state of the spare drive recorded in the drive state management table 1916 to "refuging" (S140). The CPU 1901 increases the number of background processings which is recorded in the background processing number management table 1918 with respect to the unit ID of $\alpha$ by one (S141). After that, data copying of the drive $\alpha i$ is executed by the background processing (S131). The processing goes to step S143, and the CPU 1901 increases the variable i of the drive number.

When the variable i is updated in step S143, the CPU 1901 judges whether the variable i exceeds the maximum value of the drive number (S144). As a result, when the variable i is smaller than the maximum value of the drive number, the processing returns to step S132 and the CPU 1901 checks the next drive. When the variable i exceeds the maximum value of the drive number, checking of all drives is complete. Then, the CPU 1901 judges whether the number of background processings with respect to the unit ID of $\alpha$ is zero, with referring to the background processing number management table 1918 (S145). As a result, when the number of background processings with respect to the unit (unit ID $\alpha$ is not zero), that the background processing with respect to the unit (unit ID is $\alpha$) is continued, and after the lapse of a predetermined time (S146), the CPU 1901 determines of executing step S145 again. When the number of background processings with respect to the unit ID of $\alpha$ is zero, the CPU 1901 judges that the background processing is not executing on the unit (unit ID is $\alpha$). The processing goes to step S147.

In step S147, the CPU 1901 changes a state of the unit (unit ID is $\alpha$) in which no fault has occurred, which is recorded in the drive state management table 1916 to "not in use". Then, the unit exchange indicator for the unit (unit ID is $\alpha$) is turned on (S148) and the drive exchange indicator for the drive (drive ID is $\alpha k$) is turned on (S149). After that, a notice for requesting the change of the unit (unit ID is $\alpha$) is sent to the user (S150).

FIG. 15 is a flow chart showing data rebuilding process to a RAID group according to the first embodiment of the present invention. The CPU 1901 executes data rebuilding processing by using the fault recovery program 1913. The data rebuilding processing starts in step S131 shown in FIG. 14 and is executed by background processing.

The CPU 1901 reads data from all normal drives composing the RAID group n (S161). The CPU 1901 calculates Parity (exclusive OR) of the read data to obtain the same data as stored in the drive in which a fault has occurred, thereby restoring data (S162). Then, the restored data is written to the spare drive searched in step S127 shown in FIG. 14 (S163).

The CPU 1901 judges whether all data have been written (S164). As a result, when writing of all data is not complete, the processing returns to step S161. The CPU 1901 rebuilds a data using the data read from all normal drives composing the RAID group n. When writing of all data is complete, The CPU 1901 changes the state of the spare drive recorded in the drive state management table 1916 to "in use". Then, the CPU 1901 updates a structure of drives recorded in the RAID group state management table 1917 and changes the state of RAID group n to "normal" (S165). The CPU 1901 increases the current redundancy of the RAID group n in the RAID group state management table 1917 by one (S166). The data rebuilding processing is complete by the background processing, so that the number of background processings with respect to the unit ID of α, which is recorded in the background processing number management table 1918 decrements by one (S167).

FIG. 16 is a flow chart showing data copying process for a drive according to the first embodiment of the present invention. The CPU 1901 executes the data copying processing by using the fault recovery program 1913. The data copying processing starts in step S142 shown in FIG. 14 and is executed by background processing.

First, data is read from a drive αN (unit ID is α and the drive number is N) (S171). The read data is written to the spare drive detected in step S138 shown in FIG. 14 (S172).

The CPU 1901 judges whether all data have been written (S173). As a result, when writing of all data is not complete, the processing returns to step S171. The CPU 1901 reads and copies the data. When writing of all data is complete, the CPU 1901 updates composing drives recorded in the drive state management table 1916, and changes the state of the spare drive to "in use" (S174). The CPU 1901 increases the current redundancy of the RAID group n in the RAID group state management table 1917 by one (S175). The data copying processing is complete by the background processing, so that the CPU 1901 decreases the number of background processings with respect to the unit ID (α), which is recorded in the background processing number management table 1918 by one (S176).

Figure 17:
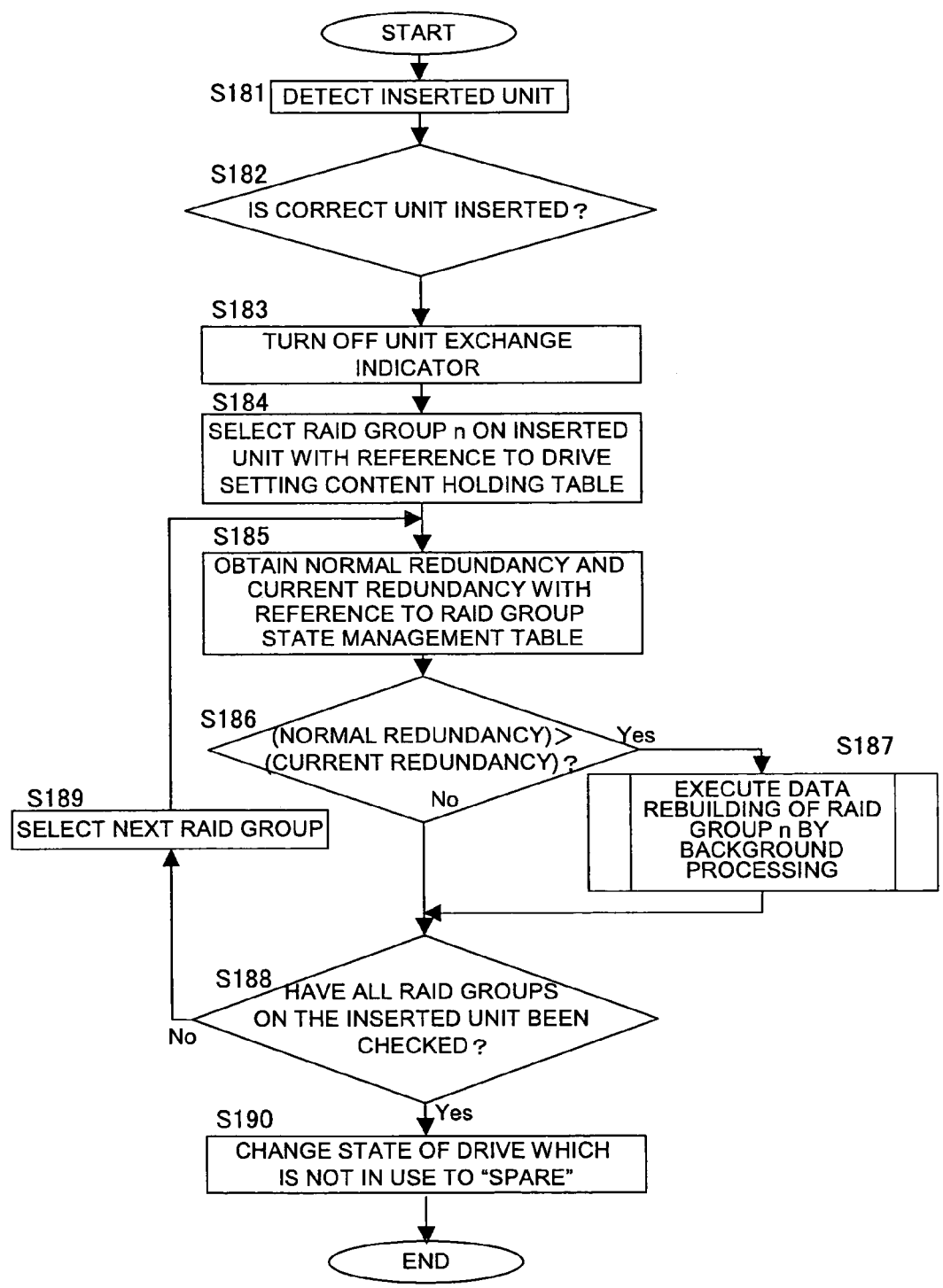
FIG. 17 is a flow chart showing exchangeable unit inserting processing according to the first embodiment of the present invention.

FIG. 17 is a flow chart showing exchangeable unit inserting processing according to the first embodiment of the present invention.

When a disk blade is inserted (S181), the CPU 1901 judges whether a correct unit is inserted according to a unit ID set in the inserted disk blade (S182). More specifically, it can be confirmed to judge whether the unit ID set in the inserted disk blade is equal to a unit ID set in a detached disk blade or to judge whether the unit ID set in the inserted disk blade is not a duplication of a unit ID of another unit which has been mounted.

After the CPU 1901 confirms that the correct unit is inserted, the unit exchange indicator for the inserted unit is turned off (S183).

The CPU 1901 selects a RAID group n to which drives of the inserted unit are assigned, with referring to the drive setting content holding table 1915 (S184).

After that, The CPU 1901 obtains the normal redundancy and the current redundancy of the RAID group n with referring to the RAID group state management table 1917 (S185). The CPU 1901 compares the normal redundancy and the current redundancy with each other (S186). As a result, when the current redundancy is smaller than the normal redundancy, the number of drives composing the RAID group n is insufficient as compared with the normal state. Thus, the CPU 1901 selects a drive into which data after rebuilding is written and changes the state of the drive recorded in the drive state management table 1916 to "rebuilding". Then, the CPU 1901 executes data rebuilding of the RAID group n by background processing (S187).

After that, the CPU 1901 judges whether checking of all RAID groups to which the drives of the inserted unit are assigned is complete (S188). As a result, when the checking of all RAID groups is not complete, the CPU 1901 selects the next RAID group (S189) and the processing returns to step S185 to check the redundancies of the selected RAID group. When the checking of all RAID groups is complete, the CPU 1901 changes a state of a drive which is not in use (that is, drive which is not used for data rebuilding in step S187) to "spare" (S190).

FIGS. 18 to 29 show changes in the drive state management table 1916, from a fault occurs in a drive B0 to the unit B is exchanged.

Before the fault is caused the drive B0 (unit ID is B and drive number is 0), the state of the drive B0 is "in use" (FIG. 18).

When the fault occurs in the drive B0, the state of the drive B0 becomes "fault" (step S123 shown in FIG. 14). The state of a detected spare drive A2 is changed to "rebuilding" (step S129 shown in FIG. 14) and data rebuilding of the drive B0 to the spare drive A2 starts (step S131 shown in FIG. 14). FIG. 19 shows a state of the data rebuilding of the drive B0. When the data rebuilding is complete, the state of the drive A2 is changed to "in use", so that the drive A2 is used as the drive composing the RAID group 2 (FIG. 20).

After data rebuilding processing on the fault drive (or in parallel thereto), data refuging processing is executed on the drives B1 to B3. The drive B1 is assigned to the RAID group 1 and the RAID level of the RAID group 1 is RAID5, so that the redundancy is one. When the drive B1 is removed, the redundancy becomes zero. Copying processing for refuging data of the drive B1 starts.

That is, the state of a detected spare drive D2 is changed to "refuging" (step S140 shown in FIG. 14) and copying of data of the drive B1 to the spare drive D2 starts (step S142 shown in FIG. 14). FIG. 21 shows a state of data refuging of the drive B1. When the data copying is complete, the state of the drive D2 is changed to "in use", so that the drive D2 is used as the drive composing the RAID group 1 (FIG. 22).

Next, the data refuging processing is executed on the drive B2. The drive B2 is assigned to the RAID group 1. When the drive B2 is removed, the redundancy becomes zero. Copying processing for refuging data of the drive B2 starts. More specifically, the state of a detected spare drive E2 is changed to "refuging" (step S140 shown in FIG. 14) and data copying from the drive B2 to the spare drive E2 starts (step S142 shown in FIG. 14). FIG. 23 shows a state of data refuging of the drive B2. When the data copying is complete, the state of the drive E2 is changed to "in use", so that the drive E2 is used as the drive composing the RAID group 1 (FIG. 24).

Next, the data refuging processing is executed on the drive B3. The drive B3 is assigned to the RAID group 4 and the RAID level of the RAID group 4 is RAID6, so that the redundancy is two. Even when the drive B3 is removed, the redundancy maintains to be one. Therefore, it is determined to be unnecessary to save the data of the drive B3 (step S136 shown in FIG. 14). FIG. 25 shows a state of data refuging of the drive B3.

When writing occurs during the refuging processing, write data is written to both the drive refuging source and the drive refuging destination. Therefore, even when data writing occurs during the refuging processing, data of the drive refuging source is not different from that of the drive refuging destination.

Then, processing on all drives of the unit B is complete, thereby completing the unit exchange processing (FIG. 14). FIG. 26 shows a state at this time.

After that, when the unit B is detached and a new disk blade is attached, the states of all drives included in the unit B become "not in use" (FIG. 27). Then, the state of the drive B3 into which data for rebuilding is written is changed to "rebuilding" and data rebuilding starts (FIG. 28). When the rebuilding is complete, the state of the drive B3 into which data for rebuilding is written is changed to "in use" and the states of the drives (B0 to B2) which are not in use are changed to "spare" (FIG. 29).

As described above, according to the first embodiment, when the unit (disk blade) is detached, the data rebuilding and data copying are executed so as to maintain the minimum redundancy of the RAID group related to the unit. After these processings are completed, the changes of the unit and the drive are instructed, so that the unit can be easily changed.

Second Embodiment

Next, a second embodiment of the present invention will be described. In the second embodiment, the guaranteed redundancy is set on each of the RAID group and it is controlled such that the redundancy of each RAID group is not below the guaranteed redundancy even when a fault occurs in a drive. In the second embodiment, only processings different from those in the first embodiment will be described and the description of the processings common to those in the first embodiment is omitted.

FIG. 30 is an explanatory diagram showing a RAID group state management table 1917b according to the second embodiment of the present invention.

In addition to the same data as in the RAID group state management table 1917 according to the first embodiment (RAID group number, total storage capacity, RAID level, normal redundancy, current redundancy, identification numbers of drives composing RAID configuration, and RAID group state), the guaranteed redundancy is recorded in the RAID group state management table 1917b. The guaranteed redundancy is minimum redundancy guaranteed to the RAID group. Even when a fault has occurred in a drive assigned to the RAID group, it is controlled such that the redundancy of the RAID group does not become smaller than the guaranteed redundancy. The description of the same data as in the RAID group state management table 1917 according to the first embodiment is omitted.

Figure 31:
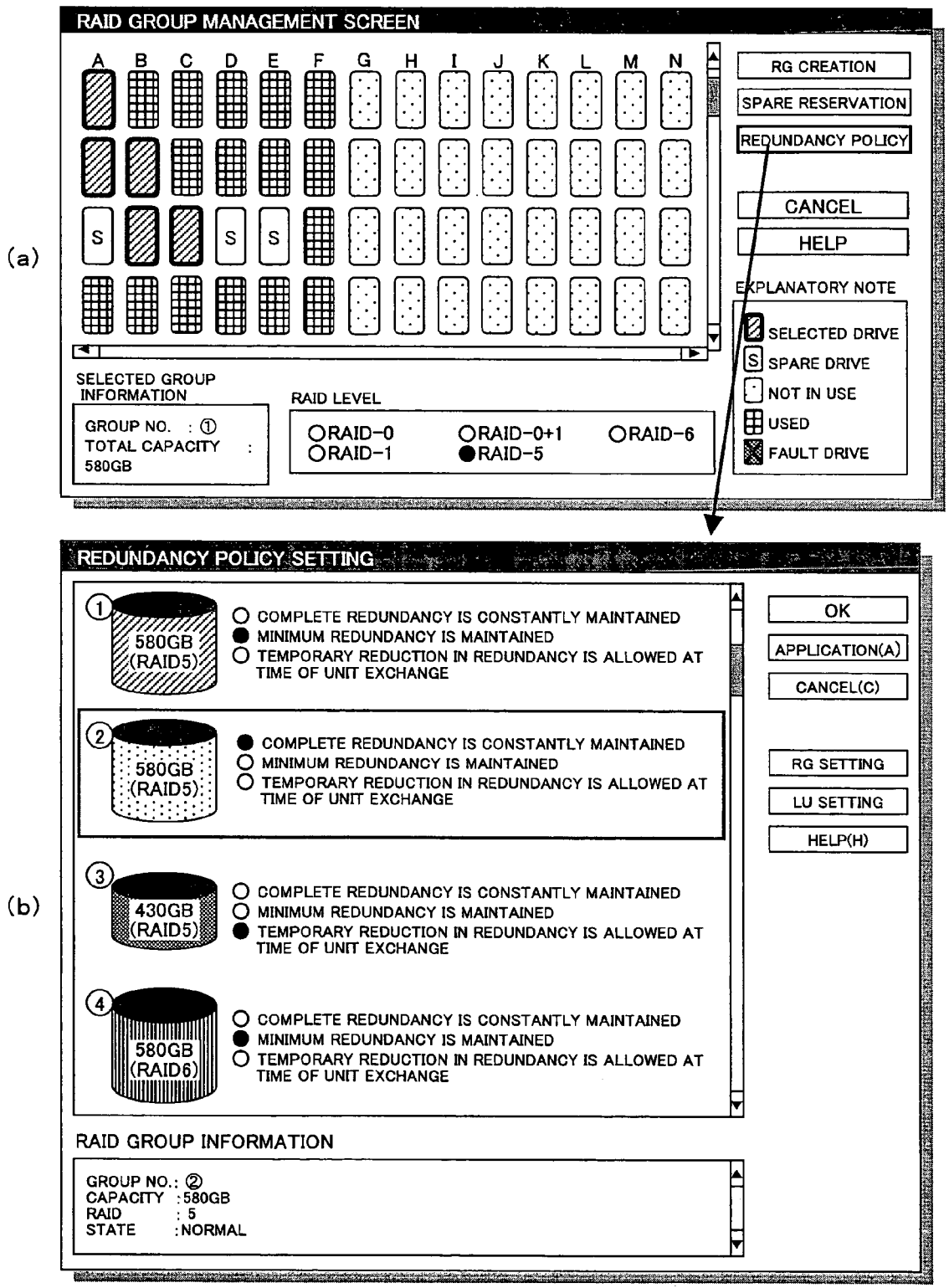
FIGS. 31A and 31B are explanatory views showing a RAID group management screen according to the second embodiment of the present invention.

FIGS. 31A and 31B are explanatory views showing a RAID group management screen according to the second embodiment of the present invention.

The RAID group management screen according to the second embodiment is different from the RAID group management screen according to the first embodiment (FIG. 12) and a "redundancy policy" bottom is provided thereon. When the "redundancy policy" bottom is operated, a redundancy policy setting screen shown in FIG. 31B opens. On the redundancy policy setting screen, a selection can be made as to whether the complete redundancy is constantly maintained, whether the minimum redundancy is maintained, or whether a temporary reduction in redundancy is allowed at the time of unit exchange on each of the RAID group.

Figure 32:
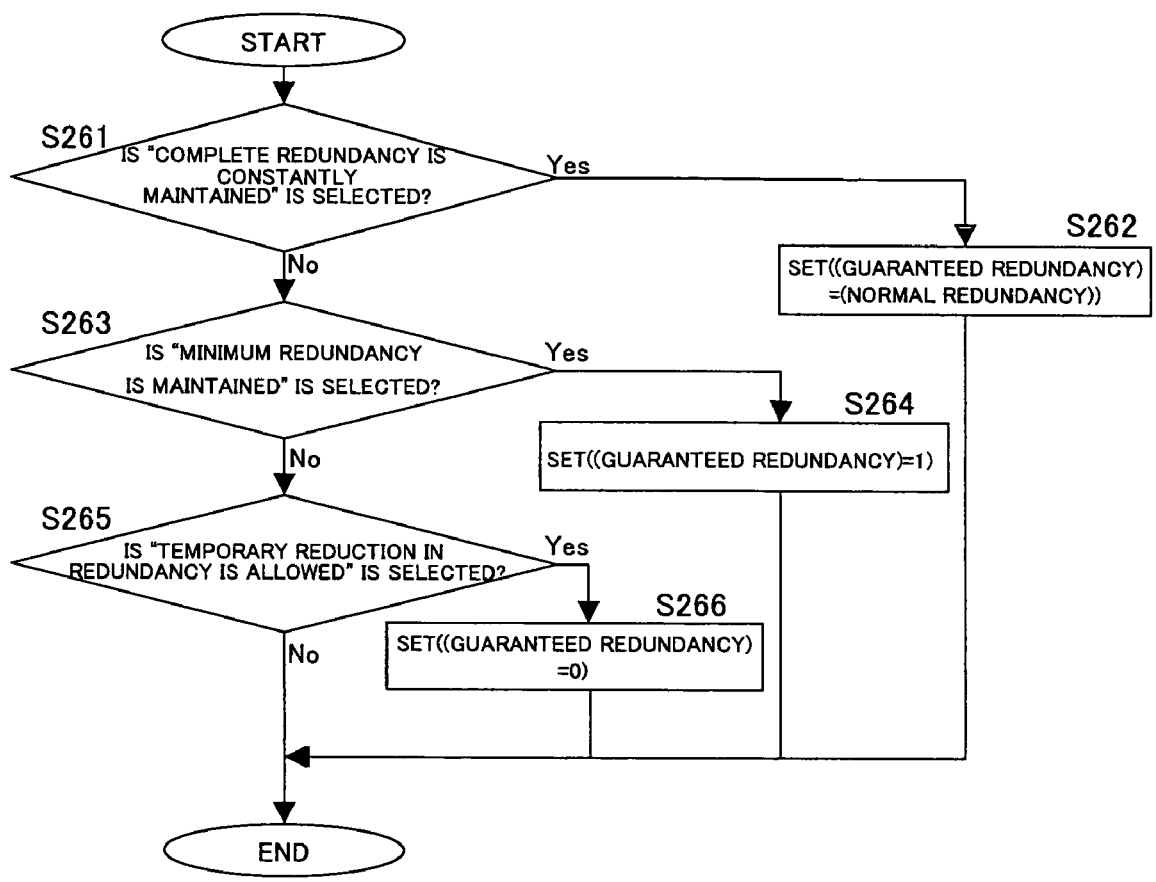
FIG. 32 is a flow chart showing guaranteed redundancy setting processing according to the second embodiment of the present invention.

FIG. 32 is a flow chart showing guaranteed redundancy setting process according to the second embodiment of the present invention. The CPU 1901 executes the guaranteed redundancy setting processing by using the RAID group setting program 1911.

First, when "complete redundancy is constantly maintained" is selected (S261), the CPU 1901 set the same value as the normal redundancy to the guaranteed redundancy to the RAID group state management table 1917b (S262). In addition, when "minimum redundancy is maintained" is selected (S263), one is set as the guaranteed redundancy in the RAID group state management table 1917b (S264). Further, when "temporary reduction in redundancy is allowed" at the time of unit exchange is selected (S265), zero is set as the guaranteed redundancy in the RAID group state management table 1917b (S266).

Figure 33:
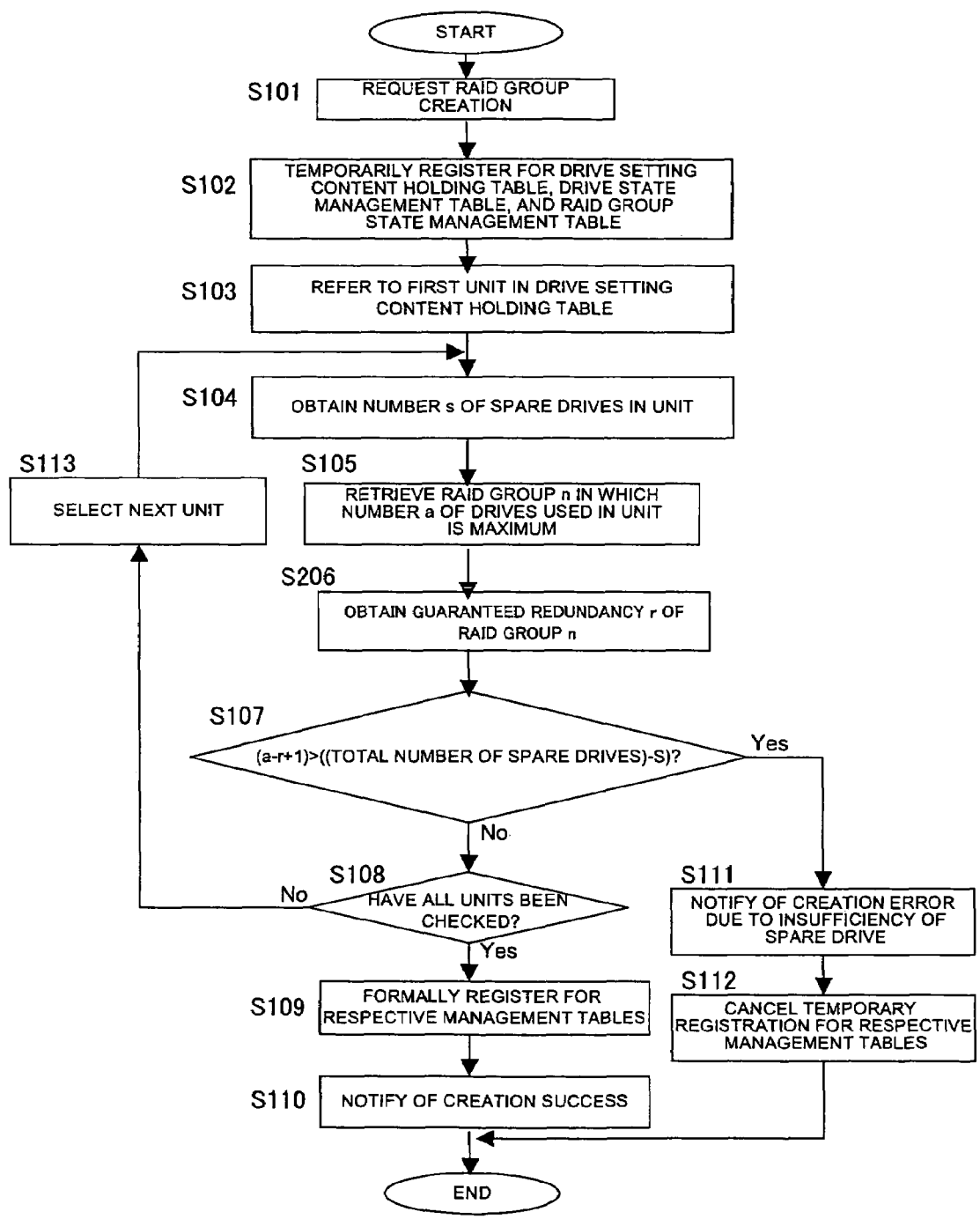
FIG. 33 is a flow chart showing RAID group creation processing according to the second embodiment of the present invention.

FIG. 33 is a flow chart showing RAID group creation process according to the second embodiment of the present invention. The CPU 1901 executes the RAID group creation processing by using the RAID group setting program 1911. The RAID group creation processing according to the second embodiment is the same to the RAID group creation processing according to the first embodiment (FIG. 13), except for step S206 and thus the description of the same processings is omitted here.

After the CPU 1901 searches maximum number a of drives using in the RAID group n in step S105, the CPU 1901 obtains an guaranteed redundancy r of the searched RAID group n with referring to the RAID group state management table 1917 (S206).

After that, the CPU 1901 compares (a−r+1) with ((the total number of spare drives)-s) to judge whether drives necessary to maintain the minimum redundancy remain as spares after the detachment of a unit (S107).

As a result of the determination, when (a−r+1)>((the total number of spare drives)-s), the CPU 1901 judges that the number of spare drives necessary to maintain the guaranteed redundancy r is insufficient in the case where the unit is detached, and a notice of a RAID creation error due to the insufficiency of the spare drive is sent (S111). Then, the CPU 1901 cancels the temporary registration of the respective management tables created in step S102 (S112).

On the other hand, when (a−r+1)≦((the total number of spare drives)-s), the CPU 1901 judges that the number of spare drives necessary to maintain the guaranteed redundancy r set to the RAID group n is sufficient even when the unit is detached.

Figure 34:
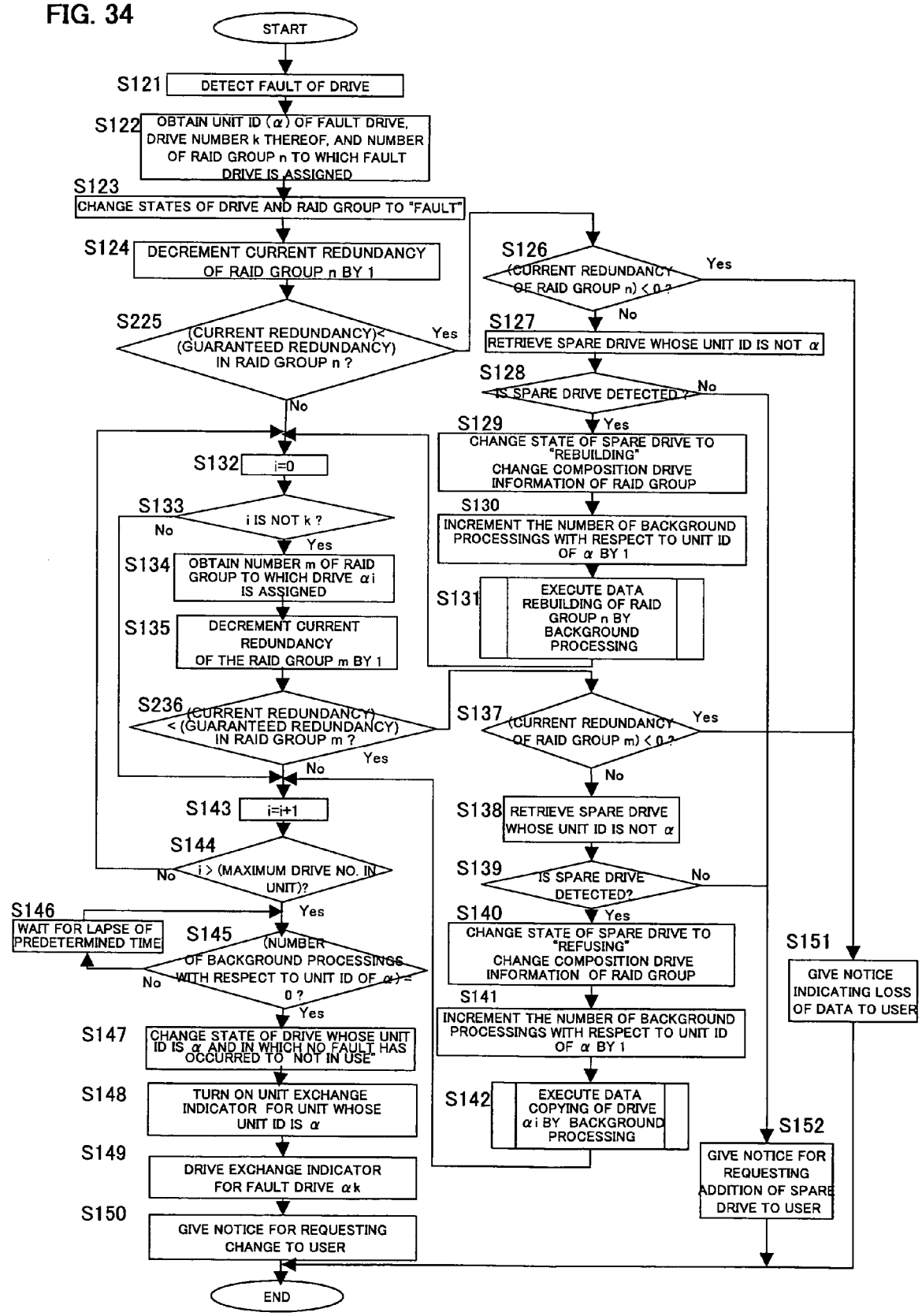
FIG. 34 is a flow chart showing unit exchange processing according to the second embodiment of the present invention.

FIG. 34 is a flow chart showing unit exchange process at a time when a fault occurs in a drive according to the second embodiment of the present invention. The CPU 1901 executes the unit exchange processing by using the fault recovery program 1913. The unit exchange processing according to the second embodiment is identical to the unit exchange processing according to the first embodiment (FIG. 14), except for steps S225 and S236 and thus the description of the same processings is omitted here.

After the current redundancy of the RAID group n corresponding to the obtained number in the RAID group state management table 1917 decrements by one in step S124, the CPU 1901 judges whether the current redundancy of the RAID group m is smaller than the guaranteed redundancy (S225).

As a result of the judgement, when the current redundancy of the RAID group n is equal to or larger than the guaranteed redundancy, the CPU 1901 initializes the variable i of the drive number (S132). When the current redundancy of the RAID group n is smaller than the guaranteed redundancy, the processing goes to step S126. In step S126, the CPU 1901 judges whether the current redundancy of the RAID group n is smaller than zero.

After the current redundancy of the RAID group m corresponding to the obtained number in the RAID group state management table 1917 decrements by one in step S135, whether the current redundancy of the RAID group m is smaller than the guaranteed redundancy is determined (S236).

As a result of the judgement, when the current redundancy of the RAID group m is equal to or larger than the guaranteed redundancy, the CPU 1901 the variable i of the drive number is incremented by 1 (S143). When the current redundancy of the RAID group m is smaller than the guaranteed redundancy, the processing goes to step S137. In step S137, the CPU 1901 judges whether the current redundancy of the RAID group m is smaller than zero. According to the processings of steps S236 and S137, the CPU 1901 estimates a change in RAID group state resulting from drives included in the unit whose unit ID is α. That is, the influence on the RAID group to which drives in which the no fault has occurred are assigned is estimated when the unit (unit ID is α) is detached.

As described above, according to the second embodiment, the guaranteed redundancy is set to each of the RAID group and it is controlled such that the redundancy of the RAID group is not below the guaranteed redundancy even when a fault occurs in a drive. Thus, the redundancy can be controlled according to a required performance (that is, importance of stored data) for each RAID group.

Third Embodiment

Next, a third embodiment of the present invention will be described. In the third embodiment, drive maintenance information is provided. The third embodiment can be additionally applied to the first and second embodiments.

Figure 35:
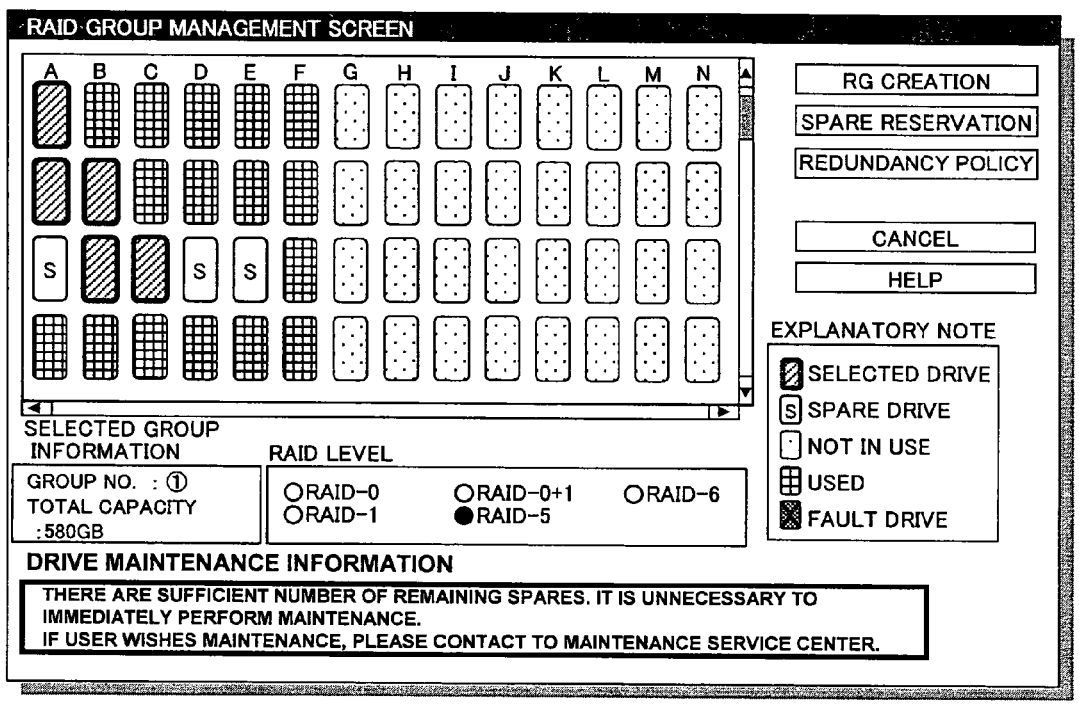
FIG. 35 is an explanatory view showing a RAID group management screen according to a third embodiment of the present invention.

FIG. 35 is an explanatory view showing a RAID group management screen according to the third embodiment of the present invention. In the RAID group management screen according to the third embodiment, a display field for the drive maintenance information is provided in a lower region thereof.

Figure 36:
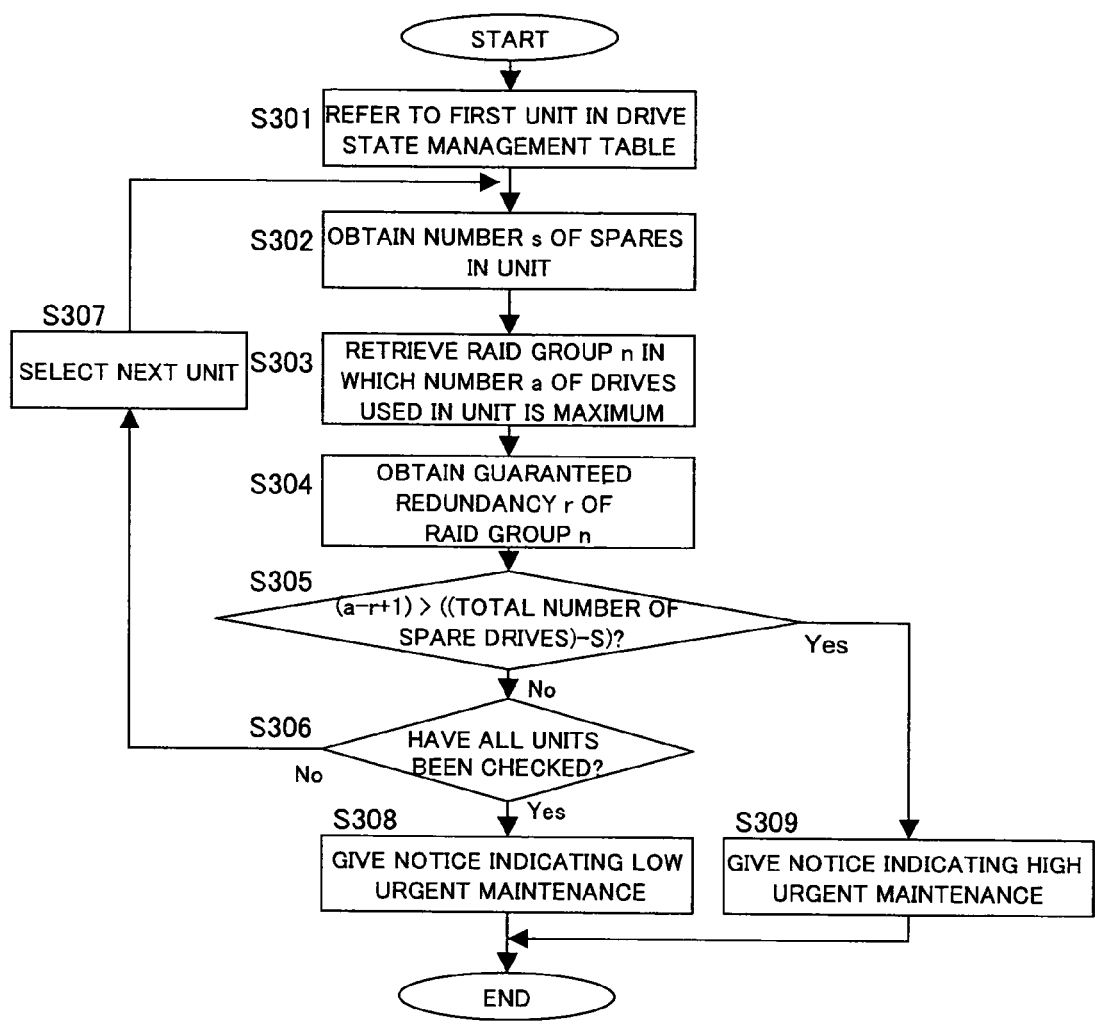
FIG. 36 is a flow chart showing urgent maintenance notice determination processing according to the third embodiment of the present invention.

FIG. 36 is a flow chart showing urgent maintenance notice determination processing according to the third embodiment of the present invention. The drive maintenance information is displayed on the RAID group management screen is selected.

First, the CPU 901 refers to a unit described first in the drive setting content holding table 1915 (S301) and obtains a number s of drives which become spares in the unit (S302). The CPU 1901 searches maximum number a of drives using in a RAID group n (S303). Then, the CPU 1901 obtains the redundancy r of the searched RAID group n with referring to the RAID group state management table 1917 (S304).

After that, the CPU 1901 compares $(a-r+1)$ with ((the total number of spare drives)-s) to judges whether drives necessary to maintain the minimum redundancy remain as spares after the detachment of a unit (S305).

As a result of the determination, when $(a-r+1)>$(the total number of spare drives)-s), the guaranteed redundancy cannot be maintained if a fault occurs in a drive. Thus, the CPU 1901 judges that the number of spare drives necessary to maintain the guaranteed redundancy r set to the RAID group n is insufficient even when the fault occurs in the drive. Then, a notice indicating that the maintenance urgency is high (it is necessary immediately to exchange fault drive or to immediately add drive) is sent (S309).

On the other hand, when $(a-r+1)\leq$((the total number of spare drives)-s), the CPU 1901 judges that the number of spare drives necessary to maintain the guaranteed redundancy r set to the RAID group n is sufficient even when the unit is detached. Then, the CPU 1901 judges whether all units are checked (S306).

As a result, when checking of all units is not complete, the processing goes to step S307 to select the next unit to be checked. Then, the processing returns to step S302 to continue the checking of the next unit.

On the other hand, when the checking of all units is complete, the guaranteed redundancy can be maintained even when a fault occurs in a single drive. Thus, a notice indicating that the maintenance urgency is low is sent (S308).

The above-mentioned urgent maintenance notice determination processing according to the third embodiment can be applied to the second embodiment. When not the guaranteed redundancy but the current redundancy of the RAID group n is used in steps S304 and S305, the urgent maintenance notice determination processing can be applied to the first embodiment.

As described above, according to the third embodiment, the drive maintenance information is provided to maintain the redundancy of the RAID group, so that the redundancy of the RAID group can be prevented from reducing lower than an expected value. In addition, a low urgent maintenance can be omitted by the urgency judgment, so that the maintenance can be performed at a time as compared with a conventional maintenance which should be performed plural times, thereby reducing cost and time for maintenance.

While the present invention has been described in detail and pictorially in the accompanying drawings, the present invention is not limited to such detail but covers various obvious modifications and equivalent arrangements, which fall within the purview of the appended claims.

What is claimed is:

1. A storage apparatus, comprising: a plurality of drive cases in each of which a plurality of units are detachably mounted, each of the units including a plurality of drives that are detachably mounted; and a controller case in which a disk control section is provided, in which RAID groups each are composed of disks included in the plurality of units, the disk control section comprising:

a drive state management table recording a state of each of the drives, a RAID group state management table recording a state of each of the RAID groups, a number of background processings indicating under execution data rebuilding processing to a RAID group and data copy processing between drives, a fault detection section for changing a state of the fault drive in the drive state management table to "fault" when a fault drive is detected, and a state of a RAID group to which the fault drive is assigned in the RAID group state management table to "fault";

a judging section for judging whether a redundancy of the RAID group to which the fault drive is assigned is smaller than a guaranteed redundancy and equal to or larger than zero, and for judging whether a redundancy of a RAID group to which another drive included in a unit including the fault drive is assigned is smaller than the guaranteed redundancy and equal to or larger than zero;

a data rebuilding section for changing a state of a spare drive searched from a unit other than the unit including the fault drive to "rebuilding" and rebuilding data in the fault drive to the spare drive when the redundancy of the RAID group to which the fault drive is assigned is smaller than the guaranteed redundancy and equal to or larger than zero, and incrementing the number of background processings by one during rebuilding processing;

a data copying section for changing a state of a spare drive searched from a unit other than the unit including the other drive to "refuging" and copying data from the said other drive to the spare drive when the redundancy of the RAID group to which the said other drive is assigned is smaller than the guaranteed redundancy and equal to or larger than zero and incrementing the number of background processings by one during data copying processing; and an exchange indicating section for judging whether processings of the data rebuilding section and the data copying section are complete based on the number of background processings and giving a notice that the fault drive and the unit including the fault drive are ready to exchange when these processings are complete.

2. The storage apparatus according to claim 1, wherein: when a redundancy of a RAID group to which a drive included in an inserted unit is assigned is smaller than a normal redundancy, the data rebuilding section rebuilds data in the RAID group to the drive included in the inserted unit; and the exchange indicating section stops an exchangeability notice related to the inserted unit according to the data rebuilding processing.

3. A storage apparatus, comprising: a plurality of drive cases in each of which a plurality of units are detachably mounted, each of the units including a plurality of drives that are detachably mounted; and a controller case in which a disk control section is provided, in which RAID groups each are composed of disks included in the plurality of units, the disk control section comprising a RAID group creation section for creating a RAID group using a plurality of disks, the RAID group creation section comprising:

an information obtaining section for obtaining a number of spare drives which are not used in a unit, a number a of drives in the unit assigned to a RAID group, and a redundancy r of the RAID group: and a judging section for judging whether the number of spare drives is insufficient when the unit is detached by comparing (a−r+1) with ((the total number of spare drives)−s), the disk control section further comprising a notice giving section for giving a notice when the judging section judges that the number of spare drives is insufficient.

4. A storage apparatus, comprising: a plurality of drive cases in each of which a plurality of units are physically detachably mounted, each of the units including a plurality of drives that are physically detachably mounted; and a controller case in which a disk control section is provided, the disk control section comprising a RAID group creation section for creating a RAID group using the plurality of disks; and an exchange indicating section for giving a notice that a unit is ready to exchange after rebuilding or copying of data in disks included in the unit upon exchange of the unit, wherein the disk control section comprises: p1 a judging section for judging whether a redundancy of a RAID group to which a drive in the unit in which a fault is detected is assigned is maintained to a predetermined value when the unit is exchanged; and a data rebuilding section for rebuilding data in the fault drive to an available drive searched from a unit other than the unit including the fault drive when the redundancy of the RAID group to which the fault drive is assigned is not maintained to the predetermined value.

5. The storage apparatus according to claim 4, wherein when a redundancy of a RAID group to which a drive included in an inserted unit is assigned is smaller than a normal redundancy, the data rebuilding section rebuilds data in the RAID group to the drive included in the inserted unit.

6. A storage apparatus, comprising: a plurality of drive cases in each of which a plurality of units are physically detachably mounted, each of the units including a plurality of drives that are physically detachably mounted; and a controller case in which a disk control section is provided, the disk control section comprising a RAID group creation section for creating a RAID group using the plurality of disks; and an exchange indicating section for giving a notice that a unit is ready to exchange after rebuilding or copying of data in disks included in the unit upon exchange of the unit, wherein the disk control section comprises:

a judging section for judging whether a redundancy of a RAID group to which a drive in the unit in which a fault is not detected is assigned is maintained to a predetermined value when the unit is exchanged; and a data copying section for copying data in the drive to an available drive searched from a unit other than the unit including the drive when the redundancy of the RAID group to which the drive is assigned is not maintained to the predetermined value.

7. A storage apparatus, comprising: a plurality of drive cases in each of which a plurality of units are physically detachably mounted, each of the units including a plurality of drives that are physically detachably mounted; and a controller case in which a disk control section is provided, the disk control section comprising a RAID group creation section for creating a RAID group using the plurality of disks; and an exchange indicating section for giving a notice that a unit is ready to exchange after rebuilding or copying of data in disks included in the unit upon exchange of the unit, wherein the disk control section comprises a judging section for judging whether the number of spare drives is insufficient when the unit is detached based on the number of spare drives which are not used in the unit, the number of drives in the unit assigned to a RAID group, and a redundancy of the RAID group upon RAID group creation.

8. A storage apparatus, comprising: a plurality of drive cases in each of which a plurality of units are physically detachably mounted, each of the units including a plurality of drives that are physically detachbly mounted; and a controller case in which a disk control section is provided, the disk control section comprising a RAID group creation section for creating a RAID group using the plurality of disks; and an exchange indicating section for giving a notice that a unit is ready to exchange after rebuilding or copying of data in disks included in the unit upon exchange of the unit, wherein the disk control section comprises:

a drive state management table recording a state of the drives, a RAID group state management table recording a state of the RAID groups, and a an information output section that outputs information for displaying the state of each of the drives and the state of each of the RAID groups based on the drive state management table and the RAID group state management table.

9. A storage apparatus, comprising: a plurality drive cases in each of which a plurality of units are physically detachably mounted, each of the units including a plurality of drives that are physically detachably mounted; and a controller case in which a disk control section is provided, the disk control section comprising a RAID group creation section for creating a RAID group using the plurality of disks; and an exchange indicating section for giving a notice that a unit is ready to exchange after rebuilding or copying of data in disks included in the unit upon exchange of the unit, wherein the exchange indicating section comprises:

a drive exchange indicating display section for displaying a notice that a drive included in the unit is ready to exchange;

a drive exchange indicating section for controlling display operation of the drive exchangeability indicating display section; and wherein the unit comprises:

a power source section for supplying power required for operating the drive exchange indicating display section and the drive exchange indicating section even when the unit is detached from the storage apparatus.

* * * * *